(12) United States Patent
Ueda et al.

(10) Patent No.: US 12,618,806 B2
(45) Date of Patent: May 5, 2026

(54) STRUCTURE EVALUATION SYSTEM, SIGNAL PROCESSING APPARATUS, STRUCTURE EVALUATION METHOD, AND NON-TRANSITORY COMPUTER READABLE RECORDING MEDIUM

(71) Applicant: KABUSHIKI KAISHA TOSHIBA, Tokyo (JP)

(72) Inventors: Yuki Ueda, Yokohama (JP); Takashi Usui, Saitama (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 546 days.

(21) Appl. No.: 18/174,228

(22) Filed: Feb. 24, 2023

(65) Prior Publication Data

US 2024/0094165 A1    Mar. 21, 2024

(30) Foreign Application Priority Data

Sep. 16, 2022    (JP) ................................. 2022-148204

(51) Int. Cl.
*G01N 29/07*        (2006.01)
*G01N 29/12*        (2006.01)

(52) U.S. Cl.
CPC ............. *G01N 29/07* (2013.01); *G01N 29/12* (2013.01)

(58) Field of Classification Search
None
See application file for complete search history.

(56) References Cited

U.S. PATENT DOCUMENTS

| | | | |
|---|---|---|---|
| 6,076,405 A | 6/2000 | Schoess | |
| 6,228,034 B1 * | 5/2001 | Voss | A61B 5/022 |
| | | | 600/500 |
| 6,874,364 B1 | 4/2005 | Campbell et al. | |
| 2012/0265450 A1 | 10/2012 | Suetsugu et al. | |

(Continued)

FOREIGN PATENT DOCUMENTS

| | | |
|---|---|---|
| CN | 102890122 A | 1/2013 |
| CN | 107850577 A | 3/2018 |

(Continued)

OTHER PUBLICATIONS

Japan Patent Office, Office Action in JP App. No. 2022-148204 (May 27, 2025).

(Continued)

*Primary Examiner* — Suman K Nath
(74) *Attorney, Agent, or Firm* — Finnegan, Henderson, Farabow, Garrett & Dunner, LLP

(57) ABSTRACT

According to one embodiment, a structure evaluation system of an embodiment includes one or more sensors, a signal processing apparatus, and an evaluator. The plurality of sensors detect elastic waves generated from a structure. The signal processing apparatus calculates information on a frequency distribution by amplitude scale based on the plurality of elastic waves detected by each of the one or more sensors, and transmits the calculated information on the frequency distribution by amplitude scale in a wireless manner. The evaluator evaluates a state of deterioration of the structure based on the information on the frequency distribution by amplitude scale which is transmitted from the signal processing apparatus.

18 Claims, 17 Drawing Sheets

(56) References Cited

U.S. PATENT DOCUMENTS

| | | | |
|---|---|---|---|
| 2016/0139084 A1 | 5/2016 | Usui et al. | |
| 2017/0254783 A1 | 9/2017 | Tralshawala et al. | |
| 2017/0363586 A1 | 12/2017 | Takamine et al. | |
| 2017/0363587 A1 | 12/2017 | Takamine et al. | |
| 2018/0266998 A1 | 9/2018 | Takamine et al. | |
| 2018/0372580 A1 | 12/2018 | Takamine et al. | |
| 2021/0181157 A1 | 6/2021 | Takamine et al. | |
| 2021/0396715 A1 | 12/2021 | Ueda et al. | |
| 2022/0187253 A1* | 6/2022 | Takamine | ............ G01N 29/043 |
| 2023/0280235 A1 | 9/2023 | Usui et al. | |

FOREIGN PATENT DOCUMENTS

| | | | |
|---|---|---|---|
| CN | 107850578 A | 3/2018 |
| CN | 108966669 A | 12/2018 |
| CN | 111183358 A | 5/2020 |
| JP | S52-33787 A | 3/1977 |
| JP | S59-175940 A | 10/1984 |
| JP | 2003-315317 A | 11/2003 |
| JP | 2006-10595 A | 1/2006 |
| JP | 2007-241583 A | 9/2007 |
| JP | 2011-80937 A | 4/2011 |
| JP | 2016-99119 A | 5/2016 |
| JP | 2018-63268 A | 4/2018 |
| JP | 2019-158899 A | 9/2019 |
| JP | 2020-8293 A | 1/2020 |
| JP | 2022-77092 A | 5/2022 |
| JP | 2023-128997 A | 9/2023 |
| WO | WO 2018/235195 A1 | 12/2018 |
| WO | WO 2021/124480 A1 | 6/2021 |

OTHER PUBLICATIONS

Takashi USUI et al., "A self-powered wireless acoustic emission monitoring system: a 3-year experiment with a reinforced concrete highway bridge," Progress in Acoustic Emission XX, 26th Int'l Acoustic Emission Symposium, pp. 150-155 (2022).
State Intellectual Property Office of People's Republic of China, Office Action in CN App. No. 202310133918.2 (Mar. 23, 2026).

* cited by examiner

STRUCTURE EVALUATION SYSTEM, SIGNAL PROCESSING APPARATUS, STRUCTURE EVALUATION METHOD, AND NON-TRANSITORY COMPUTER READABLE RECORDING MEDIUM

CROSS-REFERENCE TO RELATED APPLICATION

This application is based upon and claims the benefit of priority from Japanese Patent Application No. 2022-148204, filed Sep. 16, 2022, the entire contents of which are incorporated herein by reference.

FIELD

Embodiments described herein relate generally to a structure evaluation system, a signal processing apparatus, a structure evaluation method, and a non-transitory computer readable recording medium.

BACKGROUND

In recent years, problems associated with the aging of structures such as bridges that were built during periods of high economic growth have become apparent. Since damage in the event of an accident on a structure is immeasurable, techniques for monitoring the state of a structure have already been proposed. For example, a technique for detecting damage of a structure by an acoustic emission (AE) method has been proposed, the AE method being a method in which a high sensitivity sensor detects elastic waves generated due to the occurrence of internal cracks or progress of internal cracks. AE is an elastic wave that is generated in association with the progress of a crack of a material. In the AE method, an AE sensor using a piezoelectric element detects an elastic wave as an AE signal (voltage signal). The AE signal is detected as a sign before final fracture of a material occurs. Thus, the frequency of generation and signal intensity of the AE signal are useful as indicators of the soundness of the material. For this reason, research is being conducted into a technique for detecting signs of deterioration of a structure using the AE method.

As one method of evaluating the soundness of a structure based on an AE method, an evaluation method using a b-value derived from an empirical rule known as the Gutenberg-Richter rule in the field of seismology is known. The b-value is an evaluation value obtained from an inclination of a frequency distribution by amplitude scale, and is known to be correlated with the state of a crack inside a material. The life of structures such as bridges is generally said to be 50 years. It is essential to build a safe and secure society by monitoring the soundness of structures over a long period of time from several years to several decades. In particular, it is desired to detect signs of deterioration inside a structure before large-scale damage occurs. Long-term monitoring of a structure based on an AE method is considered promising for early detection of signs of deterioration.

However, an evaluation method in an AE method of the related art deals with relatively high-frequency signals, which may result in high power consumption.

DETAILED DESCRIPTION

The present invention provides a problem to be solved by the present invention is to provide a structure evaluation system, a signal processing apparatus, a structure evaluation method, and a non-transitory computer readable recording medium which are capable of suppressing power consumption in an acoustic emission method.

According to one embodiment, a structure evaluation system of an embodiment includes one or more sensors, a signal processing apparatus, and an evaluator. The plurality of sensors detect elastic waves generated from a structure. The signal processing apparatus calculates information on a frequency distribution by amplitude scale based on the plurality of elastic waves detected by each of the one or more sensors, and transmits the calculated information on the frequency distribution by amplitude scale in a wireless manner. The evaluator evaluates a state of deterioration of the structure based on the information on the frequency distribution by amplitude scale which is transmitted from the signal processing apparatus.

A structure evaluation system, a signal processing apparatus, a structure evaluation method, and a non-transitory computer readable recording medium according to embodiments will be described below with reference to the drawings.

First Embodiment

Figure 1:
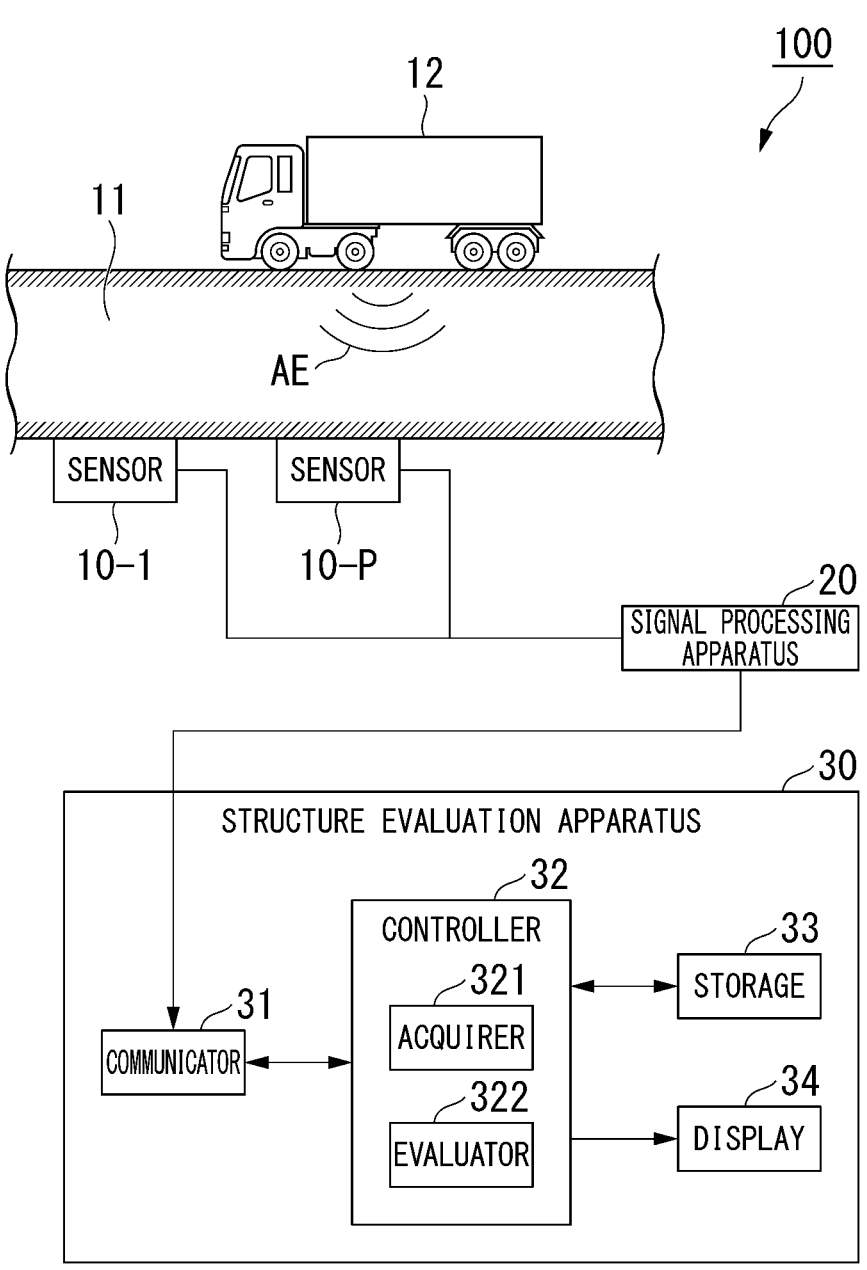
FIG. 1 is a diagram illustrating a configuration example of a structure evaluation system in a first embodiment.

FIG. 1 is a diagram illustrating a configuration example of a structure evaluation system 100 in a first embodiment. The structure evaluation system 100 is used to evaluate the soundness of a structure 11. In the following description, evaluation means determination of the degree of soundness of the structure 11, that is, the state of deterioration of the structure 11 based on a certain criterion. Note that, in the following description, a bridge made of concrete will be described as an example of the structure 11, but the structure 11 is not necessarily limited to a bridge. The structure 11 may be any structure that generates an elastic wave AE due to the occurrence or progress of a crack or an external impact (for example, rain, artificial rain, or the like). For example, the structure 11 may be a small metal structure such as a bearing or a large structure such as a bedrock. Note that bridges are not limited to structures built over rivers, valleys, and the like, but also includes various structures built above the ground (for example, viaducts of highways).

Damage that affects the evaluation of the state of deterioration of the structure 11 includes damage inside the structure 11 that interferes with the propagation of elastic waves AE, such as cracks, cavities, and landslides. Here, the cracks include a crack in a vertical direction, a crack in a horizontal direction, a crack in a diagonal direction, and the like. A crack in a vertical direction is a crack that occurs in a direction perpendicular to the surface of the structure 11 in which a sensor is installed. A crack in a horizontal direction is a crack that occurs in a direction parallel to the surface of the structure 11 in which a sensor is installed. A crack in a diagonal direction is a crack that occurs in a direction other than directions parallel and perpendicular to the surface of the structure 11 in which a sensor is installed. Sedimentation is deterioration in which concrete mainly changes into sediment at a boundary between asphalt and concrete floor slabs.

Hereinafter, a specific configuration of a structure evaluation system 100 will be described.

The structure evaluation system 100 includes a plurality of sensors 10-1 to 10-P (P is an integer equal to or greater than 2), a signal processing apparatus 20, and a structure evaluation apparatus 30. The plurality of sensors 10-1 to 10-P and the signal processing apparatus 20 are connected to each other in a wired manner. The signal processing apparatus 20 and the structure evaluation apparatus 30 are connected to each other in a wireless manner. Not that, in the following description, the sensors 10-1 to 10-P will be referred to as a sensor 10 when they are not distinguished from each other.

In FIG. 1, the structure evaluation system 100 shows a configuration including the plurality of sensors 10, but the structure evaluation system 100 is only required to include one or more sensors 10. In a case where the structure evaluation system 100 includes one sensor 10, one sensor 10 and one signal processing apparatus 20 are connected to each other in a wired manner. In a case where the structure evaluation system 100 includes the plurality of sensors 10-1 to 10-P, the structure evaluation system 100 may include a plurality of signal processing apparatuses 20-1 to 20-P. In this case, a configuration in which one sensor 10-$p$ ($1 \leq p \leq P$) and one signal processing apparatus 20-$p$ are connected to each other in a wired manner is assumed to be one set, and the structure evaluation system 100 includes P sets of configurations in each of which one sensor 10-$p$ and one signal processing apparatus 20-$p$ are connected to each other in a wired manner. In the following description, a configuration in which the structure evaluation system 100 includes one set of a combination of the sensor 10 and the signal processing apparatus 20 will be described as an example.

As illustrated in FIG. 1, when a vehicle 12 passes over the structure 11, a load is applied to a road surface due to contact between tires of the vehicle 12 and the road surface. A large number of elastic waves AE are generated inside the structure 11 due to a load. One or more sensors 10 installed on the bottom surface of the structure 11 can detect the elastic waves AE generated inside the structure 11. Note that, here, an example in which the elastic waves AE are generated inside the structure 11 by the vehicle 12 is described, but a method of generating elastic waves AE inside the structure 11 may be any of other methods. For example, elastic waves AE may be generated by applying an impact to the structure 11 from the outside by a method other than the running of the vehicle 12 or may be generated by an earthquake or the like.

The sensor 10 detects an elastic wave AE generated from inside of the structure 11. For example, the sensor 10 detects the elastic wave AE generated by the vehicle 12 passing over the structure 11. The sensor 10 is installed at a position where elastic waves AE can be detected. For example, the sensor 10 is installed on a surface different from the surface of the structure 11 to which a load is applied. In a case where the surface to which a load is applied is a road surface of the structure 11, the sensor 10 is installed on either the side surface or the bottom surface of the structure 11. The sensor 10 converts the detected elastic wave AE into an AE signal which is an electrical signal. In the following description, a case where the sensor 10 is installed on the bottom surface of the structure 11 will be described as an example. Here, in a case where the structure evaluation system 100 includes the plurality of sensors 10-1 to 10-P, the sensors 10-1 to 10-P are installed on the bottom surface of the structure 11 to be spaced apart from each other at different intervals in a vehicle running axis direction and a vehicle running axis orthogonal direction. A region surrounded by one or more sensors 10-1 to 10-P is an evaluation target region of the structure 11.

For the sensor 10, for example, a piezoelectric element having a sensitivity in the range of 10 kHz to 1 MHz is used. Piezoelectric elements that are more suitable for the sensor 10 have a sensitivity of 100 kHz to 200 kHz. Regarding the sensor 10, there are types such as a resonance type having a resonance peak in a frequency range and a broadband type with suppressed resonance, but any type of sensor 10 may be used. Methods of detecting an elastic wave AE by the sensor 10 include a voltage output type, a resistance change type, a capacitance type, and the like, but any detection method may be used. The sensor 10 may incorporate an amplifier.

An acceleration sensor may be used instead of the sensor 10. In this case, the acceleration sensor detects an elastic wave AE generated in the structure 11. The acceleration sensor converts the detected elastic wave AE into an AE signal by performing the same processing as the sensor 10.

The signal processing apparatus 20 receives an input of the AE signal output from the sensor 10. The signal processing apparatus 20 calculates information on a frequency distribution by amplitude scale based on AE signals for a predetermined period which are output from the sensor 10. The information on the frequency distribution by amplitude scale is, for example, a frequency distribution by amplitude scale, an a-value, or a b-value. The frequency distribution by amplitude scale is a distribution in which the frequency of a maximum amplitude obtained from each of the AE signals for a predetermined period is indicated. In the frequency distribution by amplitude scale, a horizontal axis represents a maximum amplitude, and a vertical axis represents a frequency. The a-value represents an intercept obtained by linearly approximating the frequency distribution by amplitude scale. The b-value represents an inclination obtained by linearly approximating the frequency distribution by amplitude scale.

The signal processing apparatus 20 wirelessly transmits transmission data including the calculated information on the frequency distribution by amplitude scale to the structure evaluation apparatus 30. The signal processing apparatus 20 may include one or more of the frequency distribution by amplitude scale, the a-value, and the b-value as the information on the frequency distribution by amplitude scale. Note that, in a case where the signal processing apparatus 20 transmits the frequency distribution by amplitude scale as the information on the frequency distribution by amplitude scale, the signal processing apparatus 20 may transmit only a difference from the frequency distribution by amplitude scale which is transmitted previously. In the following description, a case where the b-value is used as the information on the frequency distribution by amplitude scale will be described as an example.

The signal processing apparatus 20 is configured using an analog or digital circuit. The digital circuit is realized by, for example, a field programmable gate array (FPGA) and a microcomputer. Power consumption during standby can be suppressed by using a non-volatile FPGA. The digital circuit may be realized by a dedicated large-scale integration (LSI). The signal processing apparatus 20 may be equipped with a non-volatile memory such as a flash memory or a removable memory.

The structure evaluation apparatus 30 evaluates the state of deterioration of the structure 11 using the information on the frequency distribution by amplitude scale which is transmitted from the signal processing apparatus 20. The structure evaluation apparatus 30 includes a communicator 31, a controller 32, a storage 33 and a display 34.

The communicator 31 receives transmission data transmitted from the signal processing apparatus 20. For example, the communicator 31 may request the transmission data from the signal processing apparatus 20 in response to an instruction received from the outside to receive the transmission data. The communicator 31 outputs the received transmission data to the controller 32.

The controller 32 controls the entire structure evaluation apparatus 30. The controller 32 is configured using a processor such as a central processing unit (CPU) and a memory. The controller 32 functions as an acquirer 321 and an evaluator 322 by executing programs.

Some or all of the functional units of the acquirer 321 and the evaluator 322 may be realized by hardware (including circuitry) such as an application specific integrated circuit (ASIC), a programmable logic device (PLD), or an FPGA, or may be realized by software and hardware in cooperation. The program may be recorded on a computer-readable recording medium. The computer-readable recording medium is, for example, a portable medium such as a flexible disk, a magneto-optical disk, a ROM, or a CD-ROM, or a non-transitory storage medium such as a hard disk built into a computer system. The program may be transmitted via a telecommunication line.

Not all of the functions of the acquirer 321 and the evaluator 322 are required to be installed in the structure evaluation apparatus 30 in advance, and some may be realized by installing an additional application program in the structure evaluation apparatus 30.

The acquirer 321 acquires various types of information. For example, the acquirer 321 acquires the information on the frequency distribution by amplitude scale included in the transmission data received by the communicator 31. The acquirer 321 stores the acquired information on the frequency distribution by amplitude scale in the storage 33 and outputs it to the evaluator 322.

The evaluator 322 evaluates the state of deterioration of the structure 11 based on the information on the frequency distribution by amplitude scale. Specifically, the evaluator 322 performs evaluation based on the b-value when the information on the frequency distribution by amplitude scale is the b-value. The evaluation based on the b-value may be performed by a method described in Patent Document 1 below. Patent Document 1 below describes that the larger the b-value is, the higher soundness is.

(Patent Document 1: I. S. Colombo, I. Main, and M. Forde, "Assessing damage of reinforced concrete beam using 'b-value' analysis of acoustic emission signals," Journal of materials in civil engineering, vol. 15, no. 3, pp. 280-286, 2003.)

Consequently, the evaluator 322 evaluates that the state of the structure 11 is sound when the b-value is greater than a first threshold value (for example, 1.7). Soundness represents a state where there is almost no damage in the structure 11 and it can be assumed that no deterioration has occurred. The evaluator 322 evaluates that the state of the structure 11 is normal when the b-value is greater than a second threshold value (for example, 1.2) and less than the first threshold value. Being normal represents a state where damage has occurred in the structure 11, but it can be assumed that no immediate response is necessary at this time. The evaluator 322 evaluates that the state of the structure 11 deteriorates when the b-value is less than the second threshold value.

In a case where the information on the frequency distribution by amplitude scale is a frequency distribution by amplitude scale, the evaluator 322 calculates the b-value based on the frequency distribution by amplitude scale. Thereafter, the evaluator 322 performs evaluation based on the calculated b-value.

The storage 33 stores information on one or more frequency distributions by amplitude scale which are acquired by the acquirer 321. The storage 33 is configured using a storage device such as a magnetic hard disk device or a semiconductor storage device.

The display 34 displays information under the control of the controller 32. For example, the display 34 displays evaluation results of the evaluator 322. The display 34 is an image display device such as a liquid crystal display or an organic electro luminescence (EL) display. The display 34 may be an interface for connecting the image display device to the structure evaluation apparatus 30. In this case, the display 34 generates a video signal for displaying specific results and outputs the video signal to the image display device connected to itself.

Figure 2:
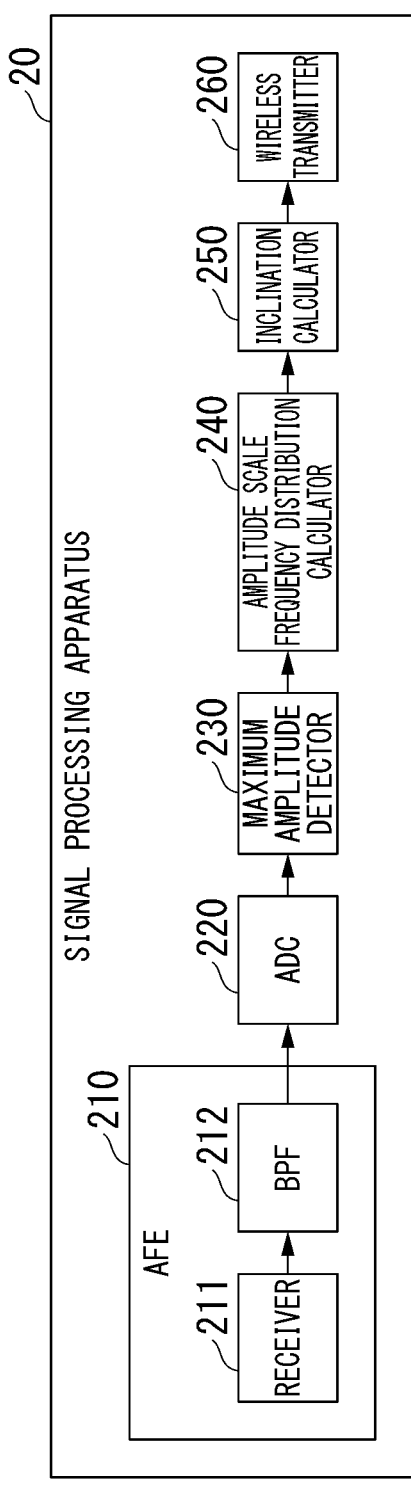
FIG. 2 is a diagram illustrating a configuration example of a signal processing apparatus in the first embodiment.

FIG. 2 is a diagram illustrating a configuration example of the signal processing apparatus 20 in the first embodiment. The signal processing apparatus 20 includes an AFE 210, an ADC 220, a maximum amplitude detector 230, an amplitude scale frequency distribution calculator 240, an inclination calculator 250, and a wireless transmitter 260.

The AFE 210 performs filtering on the AE signal output from sensor 10. The AFE 210 outputs the filtered signal to the ADC 220. The AFE 210 includes a receiver 211 and a BPF 212.

The receiver 211 receives the AE signal output from the sensor 10. The receiver 211 outputs the received AE signal to the BPF 212.

The BPF 212 removes noise from the AE signal received by the receiver 211. For example, the BPF 212 is a bandpass filter that removes frequency bands other than a specific frequency band from the AE signal as noise. The BPF 212 outputs an analog signal after noise removal (hereinafter referred to as a "noise-removed analog signal") to the ADC 220.

The ADC 220 is an analog-to-digital converter that quantizes the noise-removed analog signal output from the BPF 212 and converts it to a digital signal.

The maximum amplitude detector 230 detects a maximum amplitude based on the digital signal converted by the ADC 220.

The amplitude scale frequency distribution calculator 240 collects information on the maximum amplitude detected by maximum amplitude detector 230 for a predetermined period of time. The amplitude scale frequency distribution calculator 240 calculates a frequency distribution by amplitude scale by using the collected information on the maximum amplitude for a predetermined period. The predetermined period is, for example, a period of time, the number of days, the number of weeks, the number of months, or the like which is determined in advance. Alternatively, the predetermined period may be a period until a predetermined number of AE signals detected (the number of AE hits) is reached. The predetermined period or the predetermined number of AE hits may be recorded in the signal processing apparatus 20 in advance as a fixed value, but can be made variable by transmitting a command from the structure evaluation apparatus 30 in a wireless manner, whereby it is possible to perform evaluation more flexibly.

The inclination calculator 250 calculates the b-value using the frequency distribution by amplitude scale which is calculated by the amplitude scale frequency distribution calculator 240. The inclination calculator 250 may calculate the a-value using the frequency distribution by amplitude scale which is calculated by the amplitude scale frequency distribution calculator 240.

The wireless transmitter 260 generates transmission data including one or more b-values calculated by the inclination calculator 250, and wirelessly transmits the generated transmission data to the structure evaluation apparatus 30. Note that the wireless transmitter 260 may generate transmission data each time a b-value is obtained and wirelessly transmit the generated transmission data to the structure evaluation apparatus 30, may hold the b-values until a certain period of time has passed, generate transmission data including the held one or more b-values, and wirelessly transmit the generated transmission data to the structure evaluation apparatus 30 after a certain period of time has passed, or may generate transmission data including the b-values at a timing when a predetermined number of b-values are obtained and wirelessly transmit the generated transmission data to the structure evaluation apparatus 30. The wireless transmitter 260 performs wireless communication using, for example, a low power wide area (LPWN) technique.

In a case where the signal processing apparatus 20 transmits only the frequency distribution by amplitude scale as the information on the frequency distribution by amplitude scale, the signal processing apparatus 20 does not need to include the inclination calculator 250. The signal processing apparatus 20 may be configured to be able to select which one of the frequency distribution by amplitude scale, the a-value, and the b-value is set to be transmitted as the information on the frequency distribution by amplitude scale. With such a configuration, the amplitude scale frequency distribution calculator 240 is connected to each of the inclination calculator 250 and the wireless transmitter 260. Further, in a case where the signal processing apparatus

20 transmits the a-value or the b-value as the information on the frequency distribution by amplitude scale, the frequency distribution by amplitude scale is output from the amplitude scale frequency distribution calculator 240 to the inclination calculator 250, and in a case where the signal processing apparatus 20 transmits the frequency distribution by amplitude scale as the information on the frequency distribution by amplitude scale, the frequency distribution by amplitude scale is output from the amplitude scale frequency distribution calculator 240 to the wireless transmitter 260.

Figure 3:
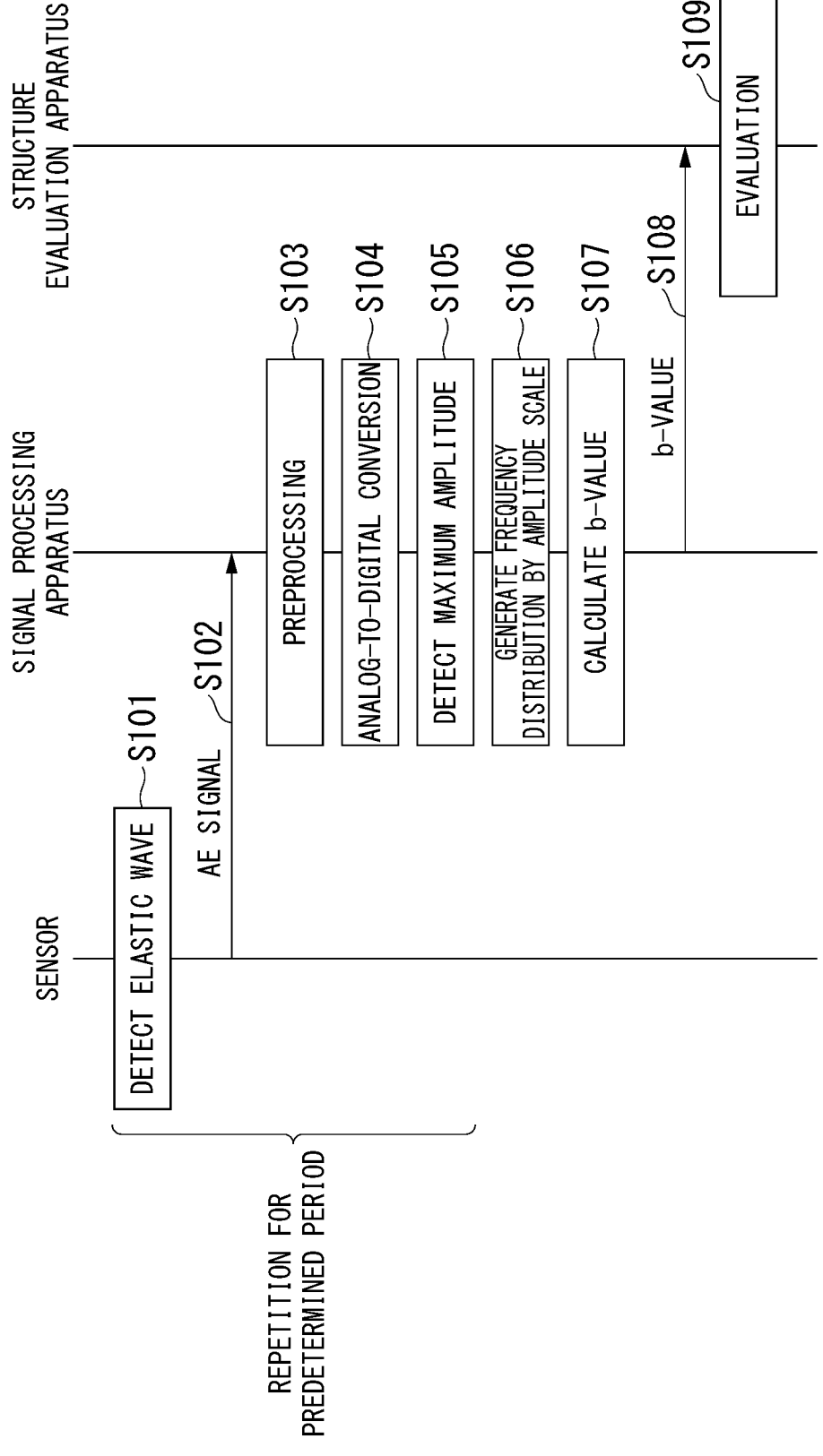
FIG. 3 is a sequence diagram illustrating a flow of processing of the structure evaluation system in the first embodiment.

FIG. 3 is a sequence diagram illustrating a flow of processing the structure evaluation system 100 in the first embodiment.

The sensor 10 detects an elastic wave AE (step S101). The sensor 10 converts the detected elastic wave AE into an AE signal. The sensor 10 transmits the AE signal to the signal processing apparatus 20 (step S102). Note that the sensor 10 converts the elastic wave AE into an AE signal and transmits the elastic wave AE to the signal processing apparatus 20 each time the elastic wave AE is detected.

The AFE 210 performs preprocessing on the AE signal transmitted from the sensor 10 (step S103). Specifically, the AFE 210 performs filtering on the AE signal. Thereby, a noise-removed analog signal based on the AE signal is generated. The AFE 210 outputs the noise-removed analog signal to the ADC 220. The ADC 220 receives an input of the noise-removed analog signal output from the AFE 210 and converts the input noise-removed analog signal into a digital signal (step S104). The ADC 220 outputs the digital signal to the maximum amplitude detector 230.

The maximum amplitude detector 230 detects a maximum amplitude of the digital signal output from the ADC 220 (step S105). The maximum amplitude detector 230 outputs information on the detected maximum amplitude to the amplitude scale frequency distribution calculator 240. The processing from step S101 to step S105 is repeatedly performed for a predetermined period. The predetermined period is, for example, a period of time, the number of days, the number of weeks, the number of months, or the like which is determined in advance. Alternatively, the predetermined period may be a period until a predetermined number of AE signals detected (the number of AE hits) is reached. Thereby, the amplitude scale frequency distribution calculator 240 can acquire a plurality of pieces of information on the maximum amplitude. The amplitude scale frequency distribution calculator 240 calculates a frequency distribution by amplitude scale using the information on the maximum amplitude for a predetermined period (step S106). The amplitude scale frequency distribution calculator 240 outputs the calculated frequency distribution by amplitude scale to the inclination calculator 250.

The inclination calculator 250 calculates a b-value using the frequency distribution by amplitude scale output from the amplitude scale frequency distribution calculator 240 (step S107). Specifically, the inclination calculator 250 calculates the b-value by obtaining an inclination of the frequency distribution by amplitude scale. The inclination calculator 250 outputs the calculated b-value to the wireless transmitter 260. The wireless transmitter 260 generates transmission data including one or more b-values output from the inclination calculator 250 and wirelessly transmits the generated transmission data to the structure evaluation apparatus 30 (step S108).

The communicator 31 of the structure evaluation apparatus 30 receives the transmission data transmitted from the signal processing apparatus 20. The communicator 31 outputs the received transmission data to the acquirer 321. The acquirer 321 acquires one or more b-values included in the transmission data. The acquirer 321 stores the acquired one or more b-values in the storage 33 and outputs them to the evaluator 322. The evaluator 322 performs evaluation based on the one or more b-values (step S109).

In the example illustrated in FIG. 3, processing in a case where the structure evaluation system 100 includes one set of one sensor 10 and one signal processing apparatus 20 is illustrated. In a case where the structure evaluation system 100 includes a plurality of sets, the processing from step S101 to step S108 may be preferably performed for each set. The evaluator 322 may preferably perform evaluation based on the b-values included in the transmission data transmitted from the signal processing apparatuses 20. In a case where there are a plurality of b-values, the evaluator 322 may perform evaluation by obtaining statistical values of the plurality of b-values. The same applies to the following embodiments.

The structure evaluation system 100 configured as described above includes one or more sensors 10 that detect elastic waves AE generated from a structure, the signal processing apparatus 20 that calculates information on a frequency distribution by amplitude scale based on the elastic waves detected by each of one or more sensors 10 and wirelessly transmits the calculated information on the frequency distribution by amplitude scale, and the structure evaluation apparatus 30 that evaluates the state of deterioration of the structure based on the information on the frequency distribution by amplitude scale transmitted from the signal processing apparatus 20. In this manner, the signal processing apparatus 20 can drastically reduce a bit rate by transmitting only the information (for example, the b-value) on the frequency distribution by amplitude scale to the structure evaluation apparatus 30. As a result, it is possible to reduce power consumption.

Further, in the structure evaluation system 100, it is possible to use long-distance wireless such as LPWA as a wireless transmission method by lowering a bit rate. For this reason, it is possible to measure an elastic wave AE in a wide range and expand an evaluation range.

Further, in the structure evaluation system 100, power consumption can be reduced, and thus it is possible to perform long-term monitoring. Further, it is not necessary to acquire all feature values of elastic waves AE as in the related art, and only an amplitude of an elastic wave AE may be able to be acquired. For this reason, it is possible to simplify a device configuration.

Second Embodiment

In the first embodiment, a configuration in which the signal processing apparatus is activated at all times has been described. On the other hand, in a second embodiment, a configuration in which a signal processing apparatus is activated when an elastic wave is detected instead of activating the signal processing apparatus at all times will be described.

Also in the related art, an event-driven configuration in which a signal processing apparatus is activated when an elastic wave is generated, instead of keeping the signal processing apparatus running at all times has been proposed. However, also in event-driven measurement, sufficient power to measure a feature value at the time of activating is required. For this reason, it is necessary to secure a long sleep time for long-term measurement, and it is not possible to acquire elastic waves during the sleep time. Further, in the event-driven measurement, it takes time to perform activating, and thus it may not be possible to correctly measure an elastic wave that triggers the activating. On the other hand, in the structure evaluation system in the second embodiment, the above-described problem is solved using a peak hold circuit. A specific configuration will be described below. Note that a system configuration of a structure evaluation system 100 in the second embodiment is the same as that in the first embodiment, and only the configuration of the signal processing apparatus is different. For this reason, differences from the first embodiment will be mainly described.

A signal processing apparatus 20a has a plurality of modes including an operation mode and a pause mode and transitions from the pause mode to the operation mode when an elastic wave AE is detected. The pause mode is a mode in which power consumption is made smaller than the operation mode by limiting a function. In a case where the signal processing apparatus 20a operates in a pause mode, the functions of some components included in the signal processing apparatus 20a are stopped. The signal processing apparatus 20a is in a pause mode until the signal processing apparatus 20a transitions to an operation mode. When the signal processing apparatus 20a transitions to an operation mode, the signal processing apparatus 20a performs processing based on a frequency distribution by amplitude scale. The processing based on the frequency distribution by amplitude scale is a processing such as detection of a maximum amplitude, calculation of a frequency distribution by amplitude scale, calculation of an a-value or a b-value, or the like, as described in the first embodiment.

Figure 4:
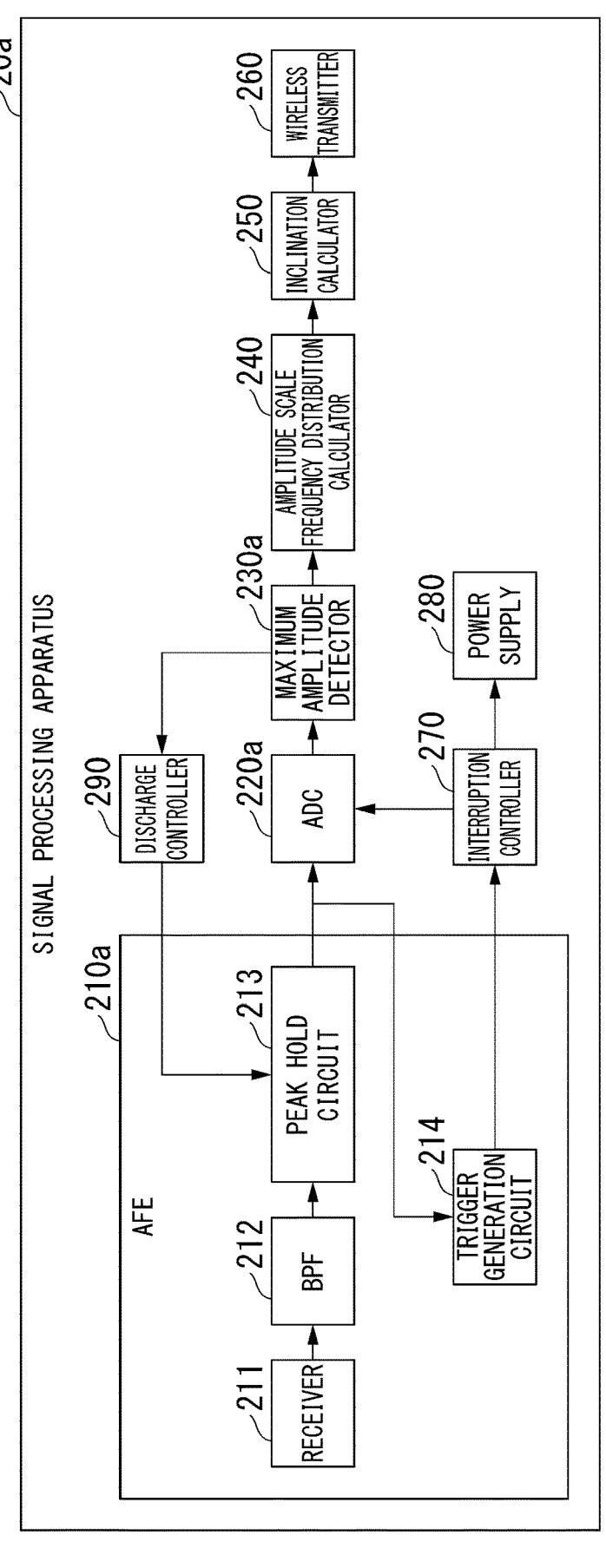
FIG. 4 is a diagram illustrating a configuration example of a signal processing apparatus in a second embodiment.

FIG. 4 is a diagram illustrating a configuration example of the signal processing apparatus 20a in the second embodiment. The signal processing apparatus 20a includes an AFE 210a, an ADC 220a, a maximum amplitude detector 230a, an amplitude scale frequency distribution calculator 240, an inclination calculator 250, a wireless transmitter 260, an interruption controller 270, a power supply 280, and a discharge controller 290. The amplitude scale frequency distribution calculator 240, the inclination calculator 250, and the wireless transmitter 260 are the same as those in the first embodiment, and thus the description thereof is omitted.

In a case where the signal processing apparatus 20a is operating in a pause mode, the functions of the ADC 220a, the maximum amplitude detector 230a, the amplitude scale frequency distribution calculator 240, the inclination calculator 250, the wireless transmitter 260, and the discharge controller 290 are stopped. That is, the ADC 220a, the maximum amplitude detector 230a, the amplitude scale frequency distribution calculator 240, the inclination calculator 250, the wireless transmitter 260, and the discharge controller 290 do not perform processing.

The AFE 210a performs filtering, peak holding, and trigger generation on an AE signal output from a sensor 10. The AFE 210a includes a receiver 211, a BPF 212, a peak hold circuit 213, and a trigger generation circuit 214.

The peak hold circuit 213 receives an input of a noise-removed analog signal output from the BPF 212. The peak hold circuit 213 holds a peak value of an amplitude of the noise-removed analog signal. The peak hold circuit 213 is an existing peak hold circuit constituted by, for example, a diode, a capacitor, a discharge resistor, a discharge switch, and the like. The time constant of the peak hold circuit 213 is determined based on the resonance frequency of the sensor 10. Note that it is desirable that the time constant of the peak hold circuit 213 is determined to be a value larger than a value when the signal processing apparatus 20 transitions to an operation mode to be able to activate processing from the trigger generation of the trigger generation circuit 214. The peak hold circuit 213 discharges the held peak value under the control of the discharge controller 290.

In a case where the signal level of the analog signal output from the peak hold circuit 213 exceeds a first threshold value regarding a signal level (hereinafter referred to as a "first signal threshold value"), the trigger generation circuit 214 generates a running signal (H) for transitioning to an operation mode. The trigger generation circuit 214 outputs the generated running signal to the interruption controller 270.

The ADC 220a is set to be operable with power supplied from the power supply 280 and operates in accordance with timing information generated by the interruption controller 270. The ADC 220a is an analog-to-digital converter that quantizes a signal of a peak value of the amplitude of the noise-removed analog signal held by the peak hold circuit 213 and converts it into a digital signal.

The maximum amplitude detector 230a detects a maximum amplitude based on the digital signal converted by the ADC 220a. The maximum amplitude detector 230a outputs information on the detected maximum amplitude to the amplitude scale frequency distribution calculator 240 and the discharge controller 290.

The interruption controller 270 switches the operation mode of the signal processing apparatus 20a based on the signal output from the trigger generation circuit 214. In a case where the signal output from the trigger generation circuit 214 is a running signal, the interruption controller 270 switches the operation mode of the signal processing apparatus 20a from a pause mode to an operation mode. In this case, the interruption controller 270 instructs the power supply 280 to supply power to stopped functional units. Thereby, power is supplied from the power supply 280 to the stopped functional units, and the stopped functional units are set to be operable. Further, the interruption controller 270 generates timing information for the ADC 220a to operate and outputs it to the ADC 220a.

The interruption controller 270 switches the operation mode of the signal processing apparatus 20a from an operation mode to a pause mode in a case where a running signal is measured for a certain period of time, in a case where an operation mode is set for a certain period of time, or after the discharge controller 290 performs discharge. In this case, the interruption controller 270 instructs the power supply 280 to stop supplying power. Thereby, the supply of power from the power supply 280 to the functional units is stopped, and the ADC 220a, the maximum amplitude detector 230a, the amplitude scale frequency distribution calculator 240, the inclination calculator 250, the wireless transmitter 260, and the discharge controller 290 stop operating.

The power supply 280 supplies power to the entire signal processing apparatus 20a or some functional units of the signal processing apparatus 20a. The power supply 280 is any one of a primary battery, a secondary battery, a solar battery, an energy harvester, or the like.

The discharge controller 290 discharges the peak hold circuit 213 in accordance with an input voltage. For example, the discharge controller 290 discharges the peak hold circuit 213 when the information on the maximum amplitude output from the maximum amplitude detector 230 is acquired. Note that the discharge controller 290 may generate a pause signal for making the signal processing apparatus 20a transition to a pause mode after the peak hold circuit 213 is discharged. In this case, the discharge controller 290 outputs the generated pause signal to the interruption controller 270. The interruption controller 270 switches the operation mode of the signal processing apparatus 20a from an operation mode to a pause mode in response to the pause signal output from the discharge controller 290.

Figure 5:
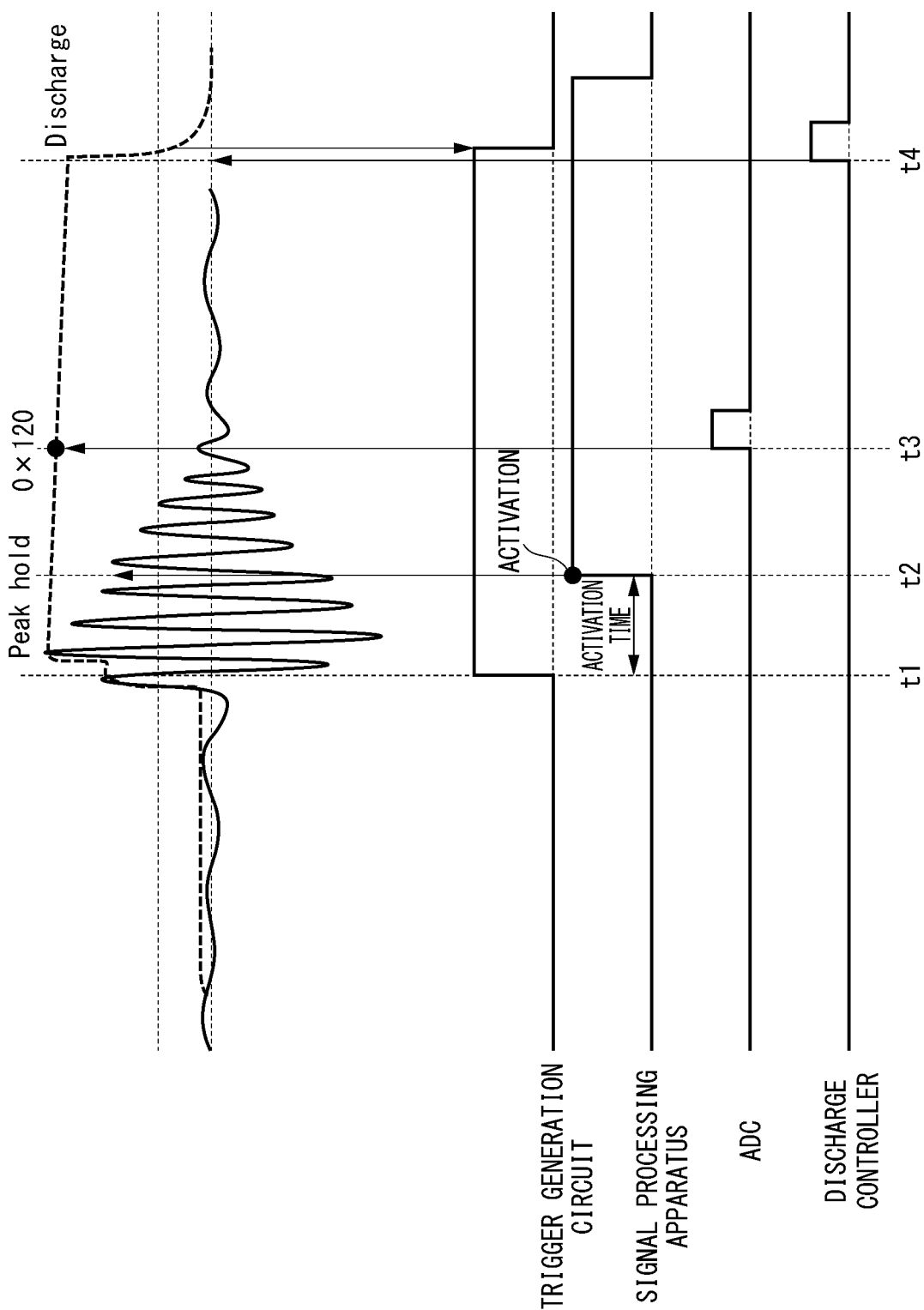
FIG. 5 is a time chart illustrating operations of the signal processing apparatus in the second embodiment.

FIG. 5 is a time chart illustrating operations of the signal processing apparatus 20a in the second embodiment. As illustrated in FIG. 5, the trigger generation circuit 214 generates a running signal at time t1 in a case where the trigger generation circuit 214 determines that the signal level of the analog signal output from the peak hold circuit 213 exceeds the first signal threshold value. The trigger generation circuit 214 outputs the generated running signal to the interruption controller 270. The interruption controller 270 makes the signal processing apparatus 20a transition to a running state based on the running signal output from the trigger generation circuit 214. The signal processing apparatus 20a prepares to activate from time t1 to time t2 with power supplied from the power supply 280 and is activated at time t2. Note that an elastic wave AE is also input to the signal processing apparatus 20a from time t1 to time t2, and the peak hold circuit 213 holds a peak value of the input elastic wave AE.

When the signal processing apparatus 20a is set to be in an operation mode at time t2, the interruption controller 270 generates timing information and outputs it to the ADC 220a. The ADC 220a performs processing at time t3 based on the timing information generated by the interruption controller 270. At this time, the ADC 220a performs analog-to-digital conversion on the signal of the peak value held by the peak hold circuit 213. Thereafter, the discharge controller 290 discharges the peak value held by the peak hold circuit 213 at time t4.

Figure 6:
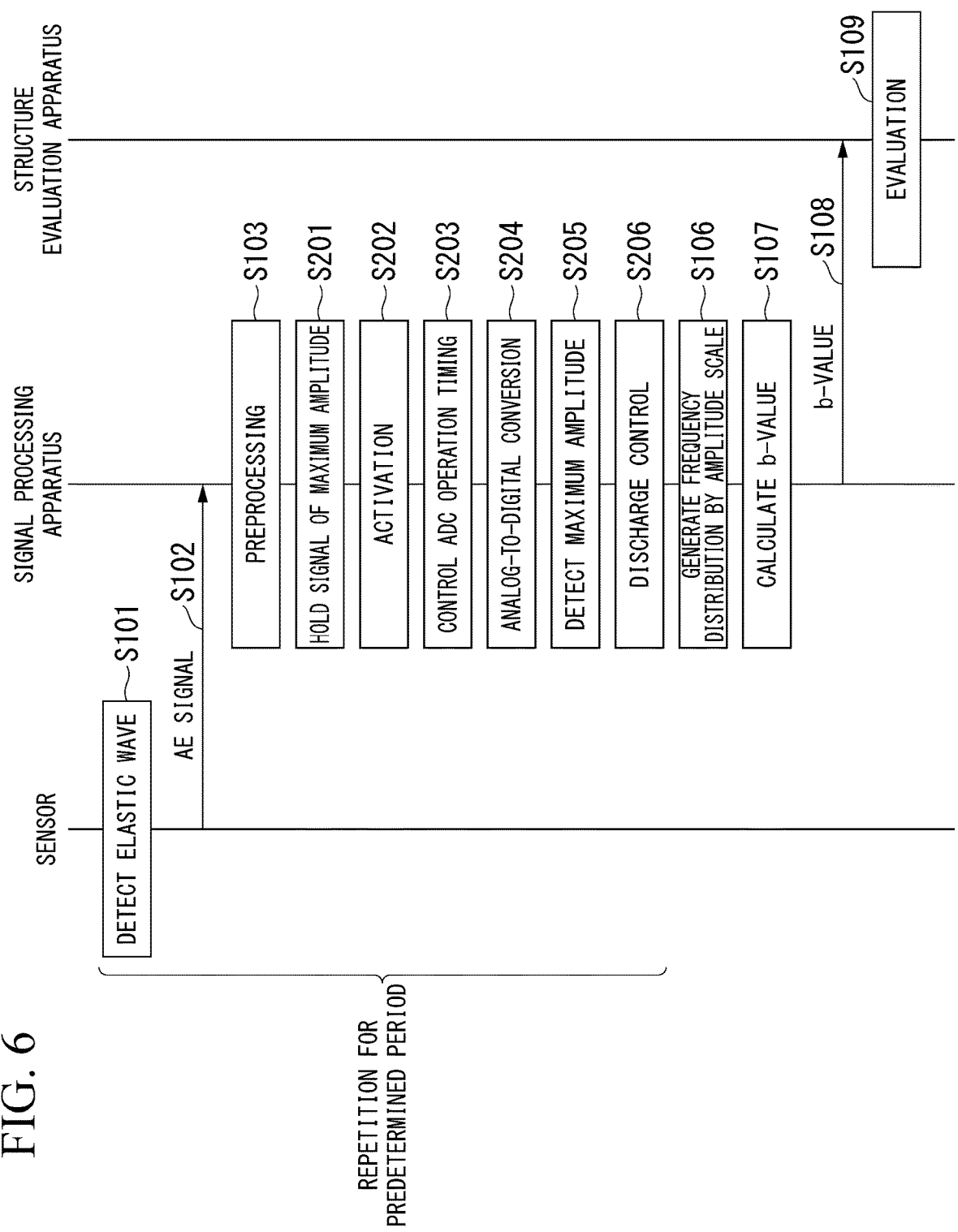
FIG. 6 is a sequence diagram illustrating a flow of processing of a structure evaluation system in the second embodiment.

FIG. 6 is a sequence diagram illustrating a flow of processing of the structure evaluation system 100 in the second embodiment. It is assumed that some functional units of the signal processing apparatus 20a are in a pause state at the start of the processing in FIG. 6. In FIG. 6, the same processing as in FIG. 3 is given the same reference numeral as in FIG. 3, and the description thereof is omitted.

When the processing from step S101 to step S103 is terminated, the peak hold circuit 213 holds a peak value (a signal of a maximum amplitude) of the noise-removed analog signal output from the BPF 212 (step S201). The trigger generation circuit 214 generates a running signal in a case where the signal level of the analog signal output from the peak hold circuit 213 exceeds the first signal threshold value. Here, it is assumed that the signal level of the analog signal exceeds the first signal threshold value. The trigger generation circuit 214 generates a running signal and outputs the generated running signal to the interruption controller 270.

The interruption controller 270 switches the operation mode of the signal processing apparatus 20a from a pause mode to an operation mode based on the running signal output from the trigger generation circuit 214. Thereby, the paused functional units of the signal processing apparatus 20a are activated (step S202). Further, the trigger generation circuit 214 generates timing information and controls an operation timing of the ADC 220a (step S203).

The ADC 220a quantizes the signal of the peak value of the amplitude of the noise-removed analog signal held by the peak hold circuit 213 and converts it into a digital signal at an operation timing based on the timing information generated by the trigger generation circuit 214 (step S204). The ADC 220a outputs the digital signal to the maximum amplitude detector 230a. The maximum amplitude detector 230a detects a maximum amplitude based on the digital signal output from the ADC 220*a* (step S205). The maximum amplitude detector 230*a* outputs information on the detected maximum amplitude to the amplitude scale frequency distribution calculator 240 and the discharge controller 290.

The discharge controller 290 discharges the peak hold circuit 213 in accordance with the information on the maximum amplitude which is output from the maximum amplitude detector 230*a* (step S206). Thereby, the signal of the peak value of the amplitude of the noise-removed analog signal held by the peak hold circuit 213 is discharged. The processing from step S101 to step S206 is repeated for a predetermined period. Due to the discharge of the peak hold circuit 213, the signal level of the analog signal output from the peak hold circuit 213 is lowered. The interruption controller 270 switches the operation mode of the signal processing apparatus 20*a* from an operation mode to a pause mode in a case where the running signal is measured for a certain period of time, in a case where an operation mode is set for a certain period of time, or after the discharge controller 290 performs discharge.

Thereby, the operations of some functional units of the signal processing apparatus 20*a* are stopped. On the other hand, the processing from step S106 to step S109 is executed until the operations of some functional units of the signal processing apparatus 20*a* are stopped from the discharge control of the discharge controller 290.

According to the structure evaluation system 100 in the second embodiment which is configured as described above, the same effects as those in the first embodiment can be obtained. Further, in the structure evaluation system 100 of the second embodiment, the signal processing apparatus 20*a* is not activated at all times, and thus power consumption can be reduced more than in the first embodiment.

Although the structure evaluation system 100 in the second embodiment has an event-driven configuration as in the related art, the structure evaluation system 100 includes the peak hold circuit 213, and thus it is possible to hold a peak value of a noise-removed analog signal which is input before all of the functional units of the signal processing apparatus 20*a* are activated. In addition, after all of the functional units of the signal processing apparatus 20*a* are activated, processing based on a frequency distribution by amplitude scale is performed based on the peak value of the noise-removed analog signal which is held in advance. For this reason, it is possible to solve a problem that an elastic wave AE that triggers the activating, which is a problem in an event-driven configuration of the related art, cannot be correctly measured. As a result, it is possible to improve the accuracy of evaluation.

Third Embodiment

In the second embodiment, a termination timing of one elastic wave is unknown, and thus, in a case where an elastic wave with a long duration is generated, the elastic wave may be divided and detected even when it is one elastic wave. In contrast, when a plurality of elastic waves with a short duration are generated, the plurality of elastic waves may be detected as one elastic wave. Consequently, in a third embodiment, a configuration in which one elastic wave is appropriately detected will be described. Note that a system configuration of a structure evaluation system 100 in the third embodiment is the same as that in the second embodiment, and only a configuration of a signal processing apparatus is different. For this reason, differences from the second embodiment will be mainly described.

A signal processing apparatus 20*b* has a plurality of modes including an operation mode and a pause mode and transitions to an operation mode when an elastic wave AE is detected. In a case where the signal processing apparatus 20*b* operates in a pause mode, the functions of some components included in the signal processing apparatus 20*b* are stopped. The signal processing apparatus 20*b* is in a pause mode until the signal processing apparatus 20*b* transitions to an operation mode. When the signal processing apparatus 20*b* transitions to an operation mode, the signal processing apparatus 20*b* performs processing based on a frequency distribution by amplitude scale.

Figure 7:
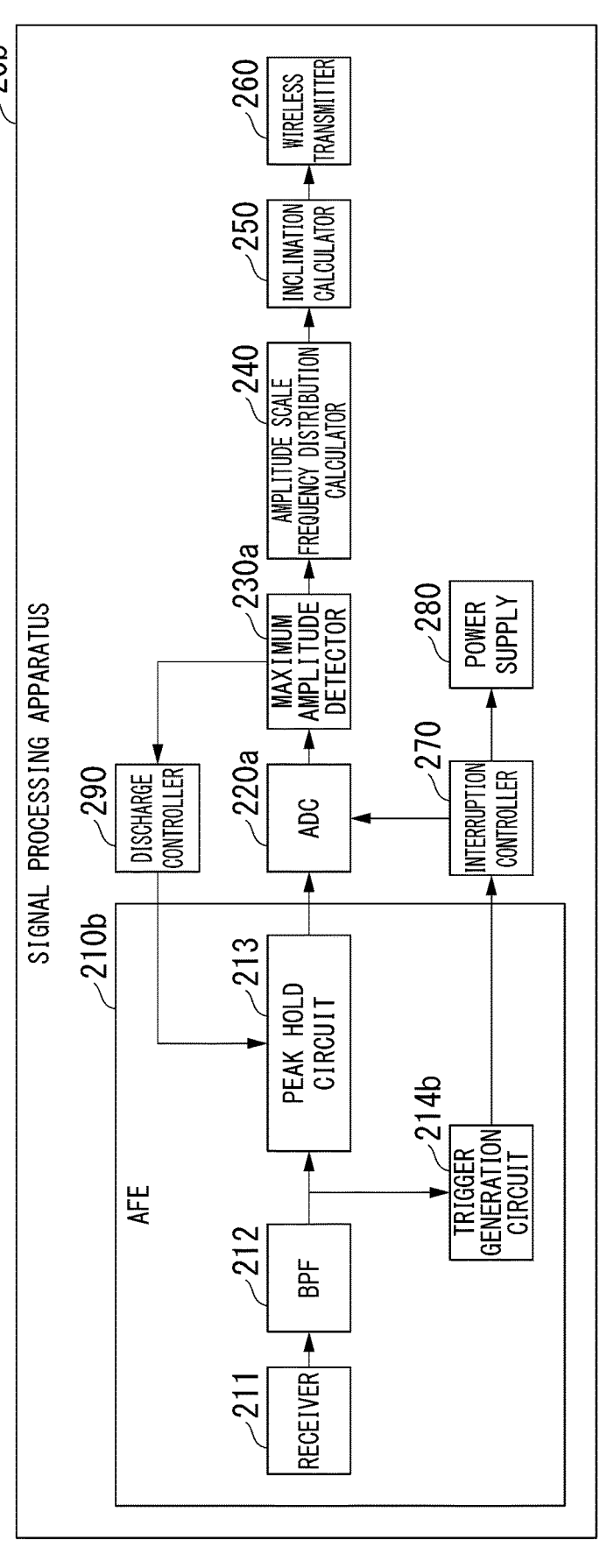
FIG. 7 is a diagram illustrating a configuration example of a signal processing apparatus in a third embodiment.

FIG. 7 is a diagram illustrating a configuration example of the signal processing apparatus 20*b* in the third embodiment. The signal processing apparatus 20*b* includes an AFE 210*b*, an ADC 220*a*, a maximum amplitude detector 230*a*, an amplitude scale frequency distribution calculator 240, an inclination calculator 250, a wireless transmitter 260, an interruption controller 270, and a power supply 280, and a discharge controller 290. Components other than the AFE 210*b* are the same as those in the second embodiment, and thus the description thereof is omitted.

The AFE 210*b* performs filtering, peak holding, and trigger generation on an AE signal output from a sensor 10. The AFE 210*b* includes a receiver 211, a BPF 212, a peak hold circuit 213, and a trigger generation circuit 214*b*.

Unlike the second embodiment, the trigger generation circuit 214*b* receives an input of a noise-removed analog signal output from the BPF 212. The trigger generation circuit 214*b* detects an envelope of the input noise-removed analog signal and generates a running signal at a timing when the signal level of the envelope exceeds a first signal threshold value and then falls below a second signal threshold value. For example, the second signal threshold value is a value smaller than the first signal threshold value. As described above, the signal level of the envelope falling below the second signal threshold value after exceeding the first signal threshold value means that an elastic wave AE is no longer detected after the detection of the elastic wave AE. The trigger generation circuit 214*b* generates a running signal in a case where a condition indicating that an elastic wave is no longer detected after the detection of the elastic wave is satisfied in this manner.

The trigger generation circuit 214*b* includes a second peak hold circuit with a time constant different from that of the peak hold circuit 213, and a comparator. The second peak hold circuit holds a peak value of an amplitude of a noise-removed analog signal and generates an envelope. The second peak hold circuit is an existing peak hold circuit constituted by, for example, a diode, a capacitor, a discharge resistor, a discharge switch, and the like. For example, the time constant of the second peak hold circuit is larger than an operation cycle t/2 and smaller than twice an operation cycle t of the sensor 10.

The comparator generates a running signal when the signal level of the envelope output from the second peak hold circuit exceeds the first signal threshold value and then falls below the second signal threshold value.

In addition, the trigger generation circuit 214*b* may be configured by combining a plurality of comparators (for example, a first comparator and a second comparator) and a low-pass filter (LPF). With such a configuration, when the noise-removed analog signal is input to the first comparator and exceeds the first signal threshold value, the first comparator outputs a detection signal (H). The LPF is applied to the detection signal (H) output from the first comparator, and a filtered signal is output. The filtered signal output from the LPF is input to the second comparator. The second comparator generates a running signal when the signal level of the input filtered signal exceeds the second signal threshold value. In this manner, the trigger generation circuit 214b may generate a signal equivalent to an envelope from which the activating and termination of one elastic wave can be detected.

Figure 8:
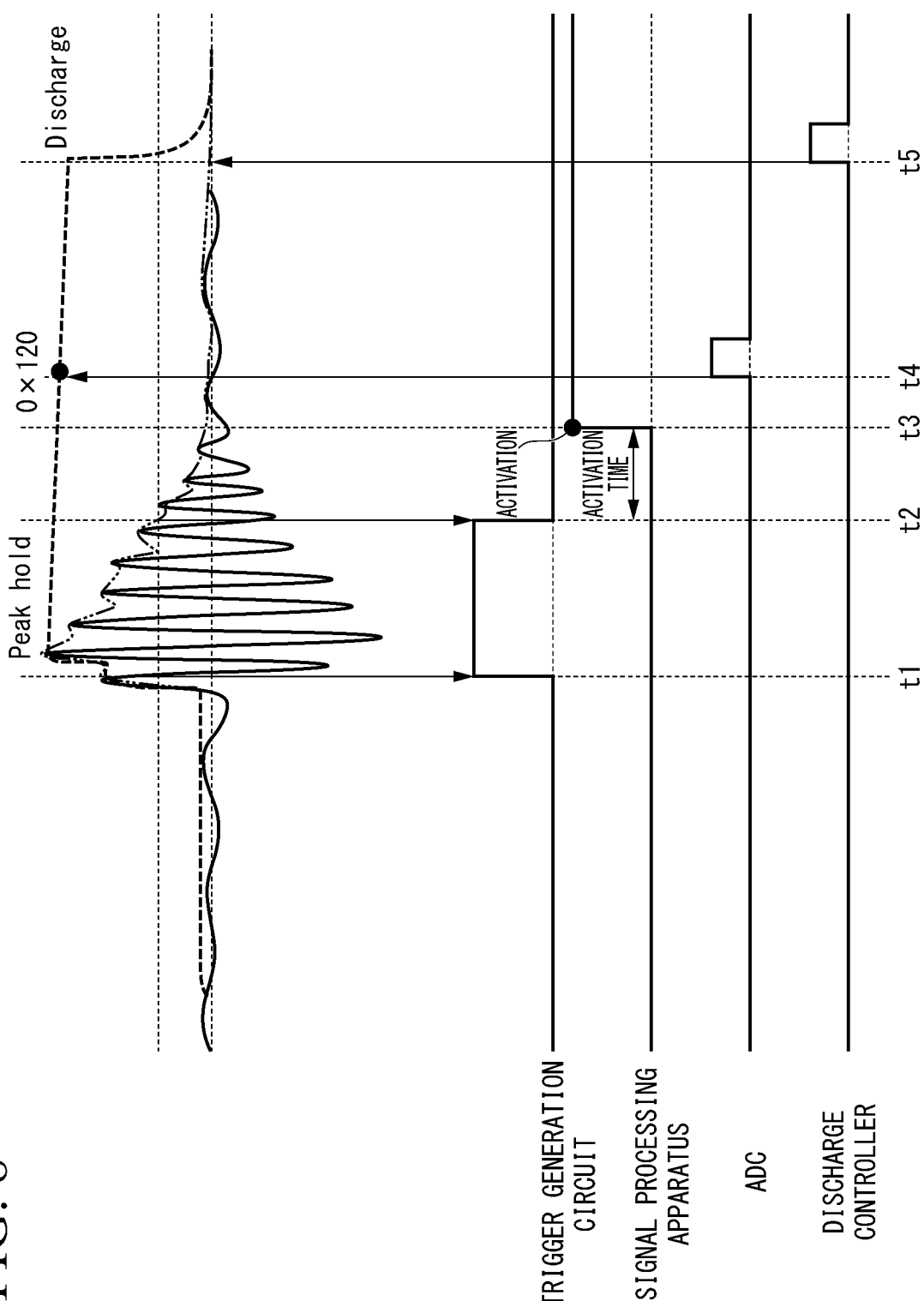
FIG. 8 is a time chart illustrating operations of the signal processing apparatus in the third embodiment.

FIG. 8 is a time chart illustrating operations of the signal processing apparatus 20b in the third embodiment. As illustrated in FIG. 8, when the signal level of the envelope of the noise-removed analog signal output from the BPF 212 exceeds the first signal threshold value and then falls below the second signal threshold value (when a trigger transitions from an ON state to an OFF state), the trigger generation circuit 214b generates a running signal at time t1. The trigger generation circuit 214b outputs the generated running signal to the interruption controller 270. The interruption controller 270 makes the signal processing apparatus 20b transition to a running state based on the running signal output from the trigger generation circuit 214b. The signal processing apparatus 20b prepares to activate from time t2 to time t3 with power supplied from the power supply 280 and is activated at time t3. Note that an elastic wave AE is also input to the signal processing apparatus 20b from time t1 to time t3, and the peak hold circuit 213 holds a peak value of the input elastic wave AE.

When the signal processing apparatus 20b is set to be in an operation mode at time t3, the interruption controller 270 generates timing information and outputs it to the ADC 220a. The ADC 220a performs processing at time t4 based on the timing information generated by the interruption controller 270. At this time, the ADC 220a performs analog-to-digital conversion on the signal of the peak value held by the peak hold circuit 213. Thereafter, the discharge controller 290 discharges the peak values held by the peak hold circuit 213 and the trigger generation circuit 214b at time t5.

Figure 9:
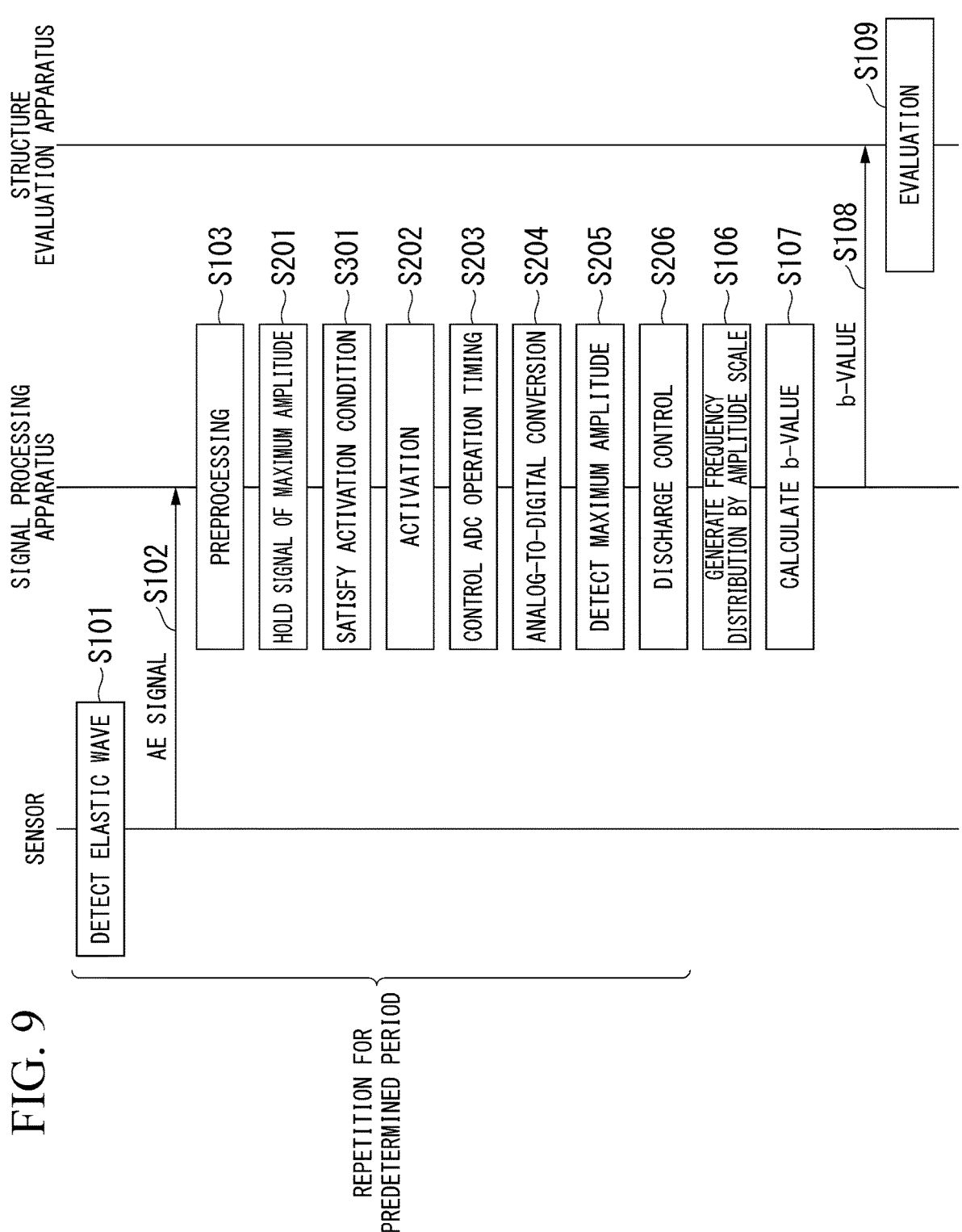
FIG. 9 is a sequence diagram illustrating a flow of processing of a structure evaluation system in the third embodiment.

FIG. 9 is a sequence diagram illustrating a flow of processing of the structure evaluation system 100 in the third embodiment. It is assumed that some functional units of the signal processing apparatus 20b are in a pause state at the start of the processing in FIG. 9. In FIG. 9, the same processing as in FIG. 6 is given the same reference numeral as in FIG. 6, and the description thereof is omitted.

When the processing from step S101 to step S103 is terminated, the noise-removed analog signal after preprocessing is output from the BPF 212 to the peak hold circuit 213 and the trigger generation circuit 214b. The peak hold circuit 213 holds a peak value of the noise-removed analog signal output from the BPF 212 (step S201). The second peak hold circuit of the trigger generation circuit 214b holds the peak value of the noise-removed analog signal output from the BPF 212. The comparator determines that an activating condition is satisfied when the signal level of the noise-removed analog signal input to the second peak hold circuit exceeds the first signal threshold value and then falls below the second signal threshold value, and the comparator generates a running signal (step S301). The trigger generation circuit 214b outputs the generated running signal to the interruption controller 270. Thereby, the processing of step S202 and the subsequent processing are executed.

According to the structure evaluation system 100 in the third embodiment which is configured as described above, an envelope is detected to detect a termination timing of one elastic wave AE. Thereby, one elastic wave AE can be appropriately detected.

Modification Example of Third Embodiment

In the above-described embodiment, a configuration in which the trigger generation circuit 214b generates a running signal at a timing when the signal level of an envelope of a noise-removed analog signal exceeds the first signal threshold value and then falls below the second signal threshold value has been described. On the other hand, a configuration in which a NOT circuit is incorporated in an output of the trigger generation circuit 214b may be adopted. With such a configuration, the interruption controller 270 has a running signal of (H).

Fourth Embodiment

In the first to third embodiments, information on time is reduced. In a fourth embodiment, description will be given of a configuration in which changes over time can be determined by acquiring time information when a maximum amplitude is detected and calculating information on time hit density such as the number of hits/time and a frequency distribution by amplitude scale for each time.

Figure 10:
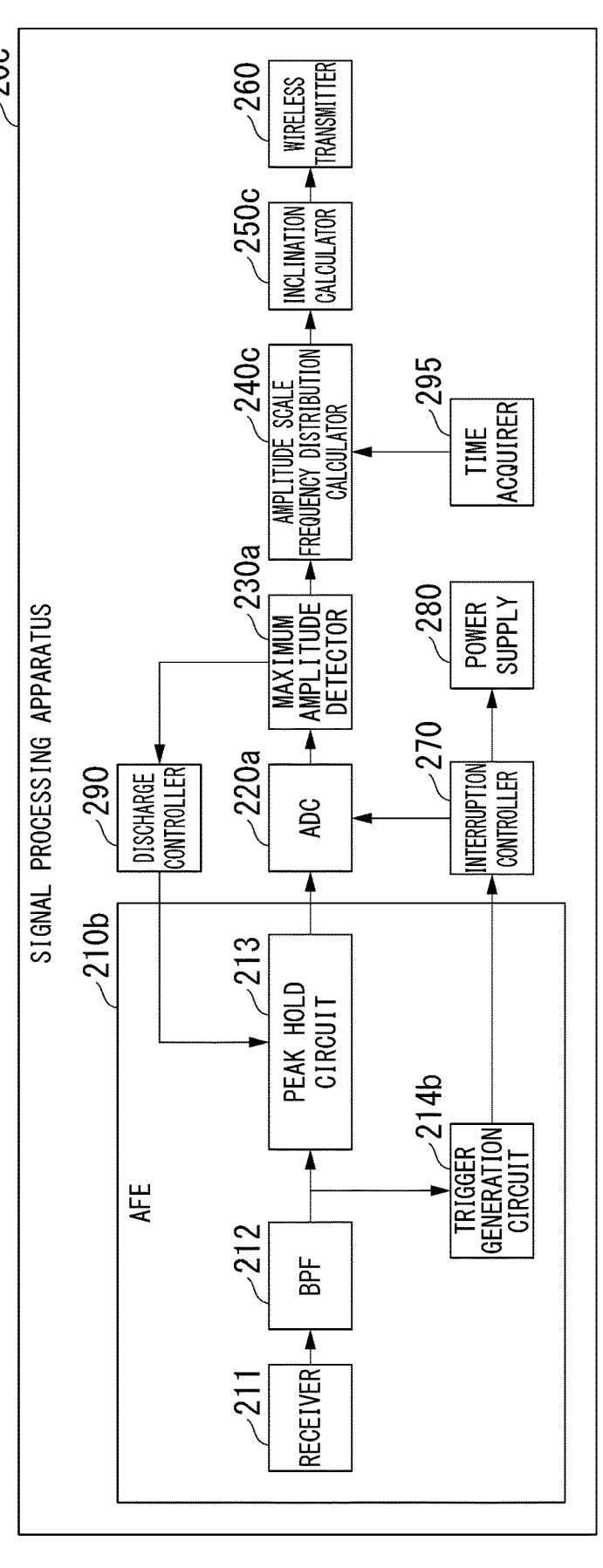
FIG. 10 is a diagram illustrating a configuration example of a signal processing apparatus in a fourth embodiment.

FIG. 10 is a diagram illustrating a configuration example of a signal processing apparatus 20c in the fourth embodiment. The signal processing apparatus 20c includes an AFE 210b, an ADC 220a, a maximum amplitude detector 230a, an amplitude scale frequency distribution calculator 240c, an inclination calculator 250c, a wireless transmitter 260, an interruption controller 270, a power supply 280, a discharge controller 290, and a time acquirer 295. The signal processing apparatus 20c is different from that in the third embodiment in terms of configurations of the amplitude scale frequency distribution calculator 240c, the inclination calculator 250c, and the time acquirer 295. Note that, in FIG. 10, a configuration based on the third embodiment is illustrated as the configuration of the signal processing apparatus 20c, but the signal processing apparatus 20c may have a configuration based on the first embodiment or the second embodiment.

In a case where the configuration of the signal processing apparatus 20c is based on the configuration of the first embodiment, the signal processing apparatus 20c is configured to include the AFE 210, the ADC 220, and the maximum amplitude detector 230 instead of the AFE 210b, the ADC 220a, and the maximum amplitude detector 230a and not to include the interruption controller 270, the power supply 280, and the discharge controller 290. In a case where the configuration of the signal processing apparatus 20c is based on the configuration of the second embodiment, the signal processing apparatus 20c is configured to include the AFE 210a instead of the AFE 210b.

The time acquirer 295 is a real time clock (RTC) and generates time information. The time acquirer 295 outputs the time information when a maximum amplitude is detected by the maximum amplitude detector 230a to the amplitude scale frequency distribution calculator 240c.

The amplitude scale frequency distribution calculator 240c calculates a frequency distribution by amplitude scale including time information based on the time information generated by the time acquirer 295. The frequency distribution by amplitude scale including the time information is a distribution in which time information is associated with each maximum amplitude used in the calculation of a frequency distribution by amplitude scale. Thereby, it is possible to ascertain at what time each maximum amplitude has been detected.

The inclination calculator 250c calculates a b-value using the frequency distribution by amplitude scale including the time information calculated by the amplitude scale frequency distribution calculator 240c. The inclination calculator 250c may calculate a b-value using the frequency distribution by amplitude scale calculated by the amplitude scale frequency distribution calculator 240c. Further, the inclination calculator 250c calculates the number of hits for each time slot using the frequency distribution by amplitude scale including the time information. Specifically, the inclination calculator 250c calculates the value of one maximum amplitude as one bit and calculates the number of hits at each time based on the time information associated with the value of the maximum amplitude. Hereafter, a distribution indicating the number of hits at each time will be referred to as an amplitude frequency distribution. Note that the width of time is set in advance.

Figure 11:
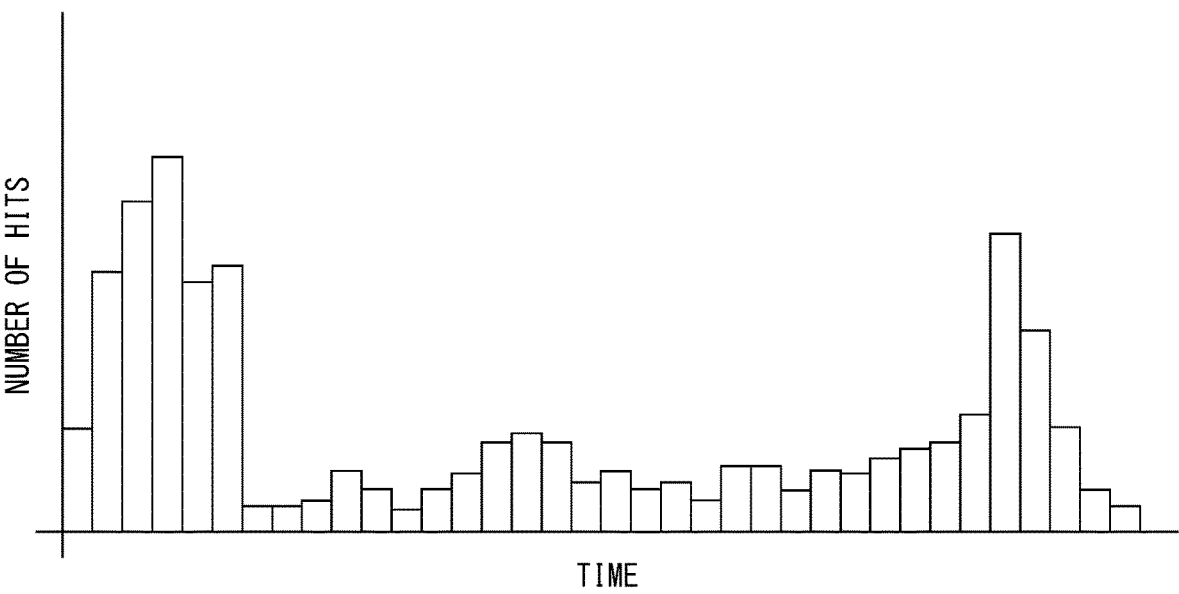
FIG. 11 is a diagram illustrating a relationship between the number of hits and a measurement time in the fourth embodiment.

FIG. 11 is a diagram illustrating a relationship between the number of hits and a measurement time in the fourth embodiment. In FIG. 11, the horizontal axis represents time, and the vertical axis represents the number of hits. As illustrated in FIG. 11, changes over time can be acquired by calculating the number of hits at each time.

Fifth Embodiment

In a fifth embodiment, a configuration in which a signal processing apparatus is activated in two steps will be described. Specifically, in the fifth embodiment, the signal processing apparatus is activated by a first step in which the entire signal processing apparatus is activated when an elastic wave is generated, and a second step in which some functional units of the signal processing apparatus are activated by the methods described in the second to fourth embodiment described above.

Figure 12:
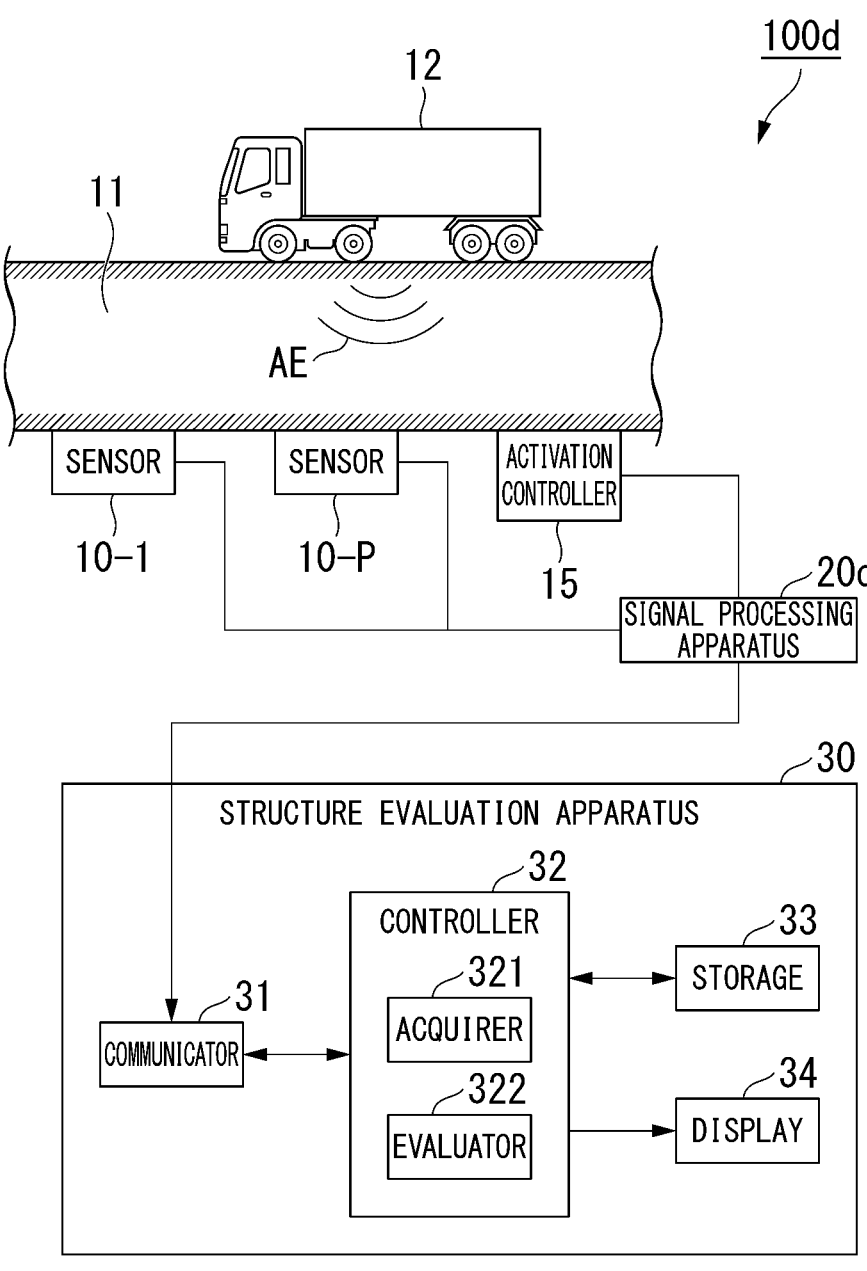
FIG. 12 is a diagram illustrating a configuration of a structure evaluation system in a fifth embodiment.

FIG. 12 is a diagram illustrating a configuration of a structure evaluation system 100d in the fifth embodiment. The structure evaluation system 100d includes a plurality of sensors 10-1 to 10-P, an activation controller 15, a signal processing apparatus 20d, and a structure evaluation apparatus 30. Each of the plurality of sensors 10-1 to 10-P and the signal processing apparatus 20d are connected to each other in a wired manner. The activation controller 15 and the signal processing apparatus 20d are connected to each other in a wired manner. The signal processing apparatus 20d and the structure evaluation apparatus 30 are connected to each other in a wireless manner. In the fifth embodiment, unlike the second to fourth embodiments, the entire signal processing apparatus 20d is set to be in a sleep state.

FIG. 12 illustrates a configuration in which the structure evaluation system 100d includes the plurality of sensors 10, but the structure evaluation system 100d is only required to include one or more sensors 10. In a case where the structure evaluation system 100d includes one sensor 10, one sensor 10 and one signal processing apparatus 20d are connected to each other in a wired manner. In a case where the structure evaluation system 100 includes a plurality of sensors 10, the structure evaluation system 100d may include a plurality of signal processing apparatuses 20d. In this case, a configuration in which one sensor 10-p and one signal processing apparatus 20d-p are connected to each other in a wired manner is assumed to be one set, and the structure evaluation system 100d includes P sets of configurations in each of which one sensor 10-p and one signal processing apparatus 20d-p are connected to each other in a wired manner.

Similarly to the sensor 10, the activation controller 15 is installed on a surface different from the surface of a structure 11 to which a load is applied. The activation controller 15 is a sensor that detects the approach of a vehicle 12, and an acceleration sensor can be used. The approach of the vehicle can be detected from acceleration generated as the vehicle 12 passes. Note that a micro electro mechanical system (MEMS) acceleration sensor is preferable from the viewpoint of low power consumption. When the approach of the vehicle 12 is detected, the activation controller 15 output an activation signal for setting to the signal processing apparatus 20d to be in a signal reception mode to the signal processing apparatus 20d. Setting the signal processing apparatus 20d to be in a signal reception mode is allowing the signal processing apparatus 20d to receive an AE signal output from the sensor 10. That is, the signal processing apparatus 20d does not receive an AE signal output from the sensor 10 until an activation signal is acquired from the activation controller 15. Thereby, it is possible to suppress power consumption of the signal processing apparatus 20d.

The signal processing apparatus 20d has a plurality of modes including an operation mode, a pause mode, and a signal reception mode and transitions to the signal reception mode based on the activation signal output from the activation controller 15. An internal configuration of the signal processing apparatus 20d is the same as any one of the second to fourth embodiments. Here, description is given on the assumption that the internal configuration of the signal processing apparatus 20d is the same as that in the second embodiment. When the signal processing apparatus 20d transitions to a signal reception mode, the signal processing apparatus 20d activates a functional unit other than a functional unit that is activated in an operation mode. The functional unit other than the functional unit that is activated in an operation mode is, for example, the AFE 210a. When the AFE 210a of the signal processing apparatus 20d is activated in response to the activation signal output from the activation controller 15, the same processing as that in the second embodiment is performed.

According to the structure evaluation system 100d of the fifth embodiment which is configured as described above, power consumption can be further reduced.

Sixth Embodiment

In the first to fifth embodiments, as a configuration for reducing power consumption, a configuration in which the signal processing apparatus transmits information on a frequency distribution by amplitude scale to the structure evaluation apparatus has been described. On the other hand, in a sixth embodiment, description is given of a configuration in which power consumption can be reduced without necessarily transmitting information on a frequency distribution by amplitude scale by performing activating based on a peak hold circuit as described in the second to fourth embodiments.

Figure 13:
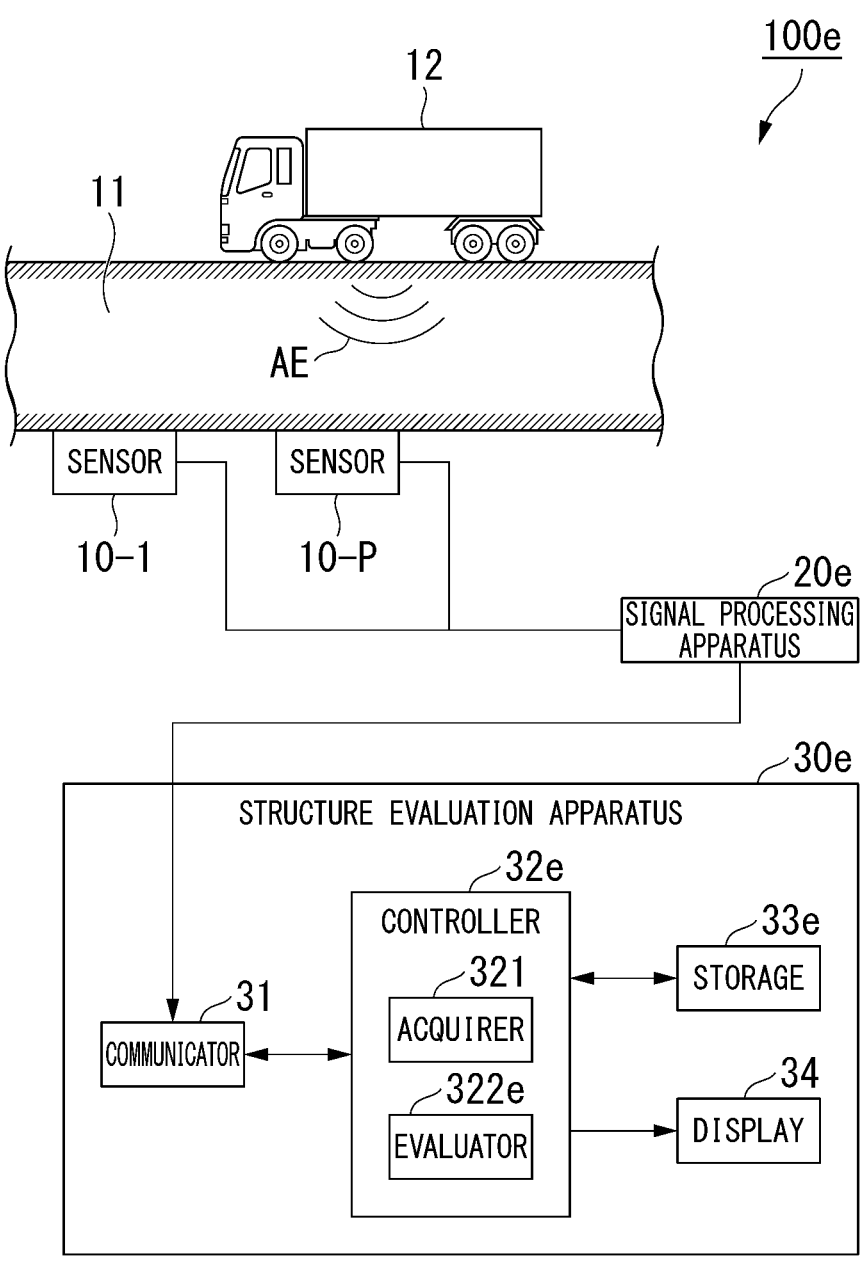
FIG. 13 is a diagram illustrating a configuration example of a structure evaluation system in a sixth embodiment.

FIG. 13 is a diagram illustrating a configuration example of a structure evaluation system 100e in the sixth embodiment. The structure evaluation system 100e is used to evaluate the soundness of a structure 11. The structure evaluation system 100e includes a plurality of sensors 10-1 to 10-P, a signal processing apparatus 20e, and a structure evaluation apparatus 30e. Each of the plurality of sensors 10-1 to 10-P and the signal processing apparatus 20e are connected to each other in a wired manner. The signal processing apparatus 20e and the structure evaluation apparatus 30e are connected to each other in a wireless manner.

FIG. 13 illustrates a configuration in which the structure evaluation system 100e includes the plurality of sensors 10, but the structure evaluation system 100e is only required to include one or more sensors 10. In a case where the structure evaluation system 100e includes one sensor 10, one sensor 10 and one signal processing apparatus 20e are connected to each other in a wired manner. In a case where the structure evaluation system 100e includes a plurality of sensors 10-1 to 10-P, the structure evaluation system 100e may include a plurality of signal processing apparatuses 20e-1 to 20e-P. In this case, a configuration in which one sensor 10-p and one signal processing apparatus 20e-p are connected to each other in a wired manner is assumed to be one set, and the structure evaluation system 100e includes P sets of configurations in each of which one sensor 10-p and one signal processing apparatus 20e-p are connected to each other in a wired manner.

The signal processing apparatus 20e has a plurality of modes including an operation mode and a pause mode and transitions to an operation mode when an elastic wave AE is detected. The signal processing apparatus 20e is in a pause mode until the signal processing apparatus 20e transitions to an operation mode. When the signal processing apparatus 20e transitions to an operation mode, the signal processing apparatus 20e performs processing based on the elastic wave AE. The processing based on the elastic wave AE is processing such as detection of a maximum amplitude or calculation of an amplitude frequency distribution. Note that the processing based on the elastic wave AE is not limited thereto, and calculation of energy, or the like may be performed. The signal processing apparatus 20e transmits transmission data including information on the elastic wave AE obtained by the processing based on the elastic wave AE to the structure evaluation apparatus 30e in a wireless manner. In the following explanation, a case where the amplitude frequency distribution is used as the information on the elastic wave AE will be described as an example.

The signal processing apparatus 20e is configured using an analog circuit or a digital circuit. The digital circuit is realized by, for example, an FPGA or a microcomputer. Power consumption during standby can be suppressed by using a non-volatile FPGA. The digital circuit may be realized by a dedicated LSI. The signal processing apparatus 20e may be equipped with a non-volatile memory such as a flash memory or a removable memory.

The structure evaluation apparatus 30e evaluates the state of deterioration of a structure 11 based on the information on the elastic wave AE transmitted from the signal processing apparatus 20e.

The structure evaluation apparatus 30e includes a communicator 31, a controller 32e, a storage 33e, and a display 34. The communicator 31 and the display 34 included in the structure evaluation apparatus 30e are the same as those in the first to fifth embodiments.

The controller 32e controls the entire structure evaluation apparatus 30e. The controller 32e is configured using a processor such as a CPU and a memory. The controller 32e functions as an acquirer 321 and an evaluator 322e by executing programs.

Some or all of the functional units of the acquirer 321 and the evaluator 322e may be realized by hardware (including circuitry) such as an ASIC, a PLD, or an FPGA, or may be realized by cooperation of software and hardware. The program may be recorded on a computer-readable recording medium. The computer-readable recording medium is, for example, a portable medium such as a flexible disk, a magneto-optical disk, a ROM, or a CD-ROM, or a non-transitory storage medium such as a hard disk built into a computer system. The program may be transmitted via a telecommunication line.

Some of the functions of the acquirer 321 and the evaluator 322e are not required to be installed in the structure evaluation apparatus 30e in advance, and may be realized by installing an additional application program in the structure evaluation apparatus 30e.

The evaluator 322e evaluates the state of deterioration of the structure 11 based on the information on the elastic wave AE acquired by the acquirer 321. In a case where the information on the elastic wave AE is an amplitude frequency distribution, the evaluator 322e performs evaluation based on the Kaiser effect. The Kaiser effect is a phenomenon in which, in a case where the structure 11 is sound when a preload is removed and a load is applied again, almost no elastic wave AE is detected until the preload is reached. In this manner, when the structure 11 is sound, almost no elastic wave AE is detected until the preload is reached, and thus when a large number of elastic waves AE are detected, there is a high possibility that the structure 11 will deteriorate. Consequently, the evaluator 322e evaluates that the structure is sound when there is no time slot in which the number of hits is equal to or greater than a threshold value, with reference to the amplitude frequency distribution. On the other hand, the evaluator 322e evaluates that the structure deteriorates when there is a time slot in which the number of hits is equal to or greater than the threshold value, with reference to the amplitude frequency distribution. In addition, for example, by using the plurality of sensors 10 and the plurality of signal processing apparatuses 20e, representative values of elastic waves AE at sensor positions for a certain period of time are complemented and drawn as a two-dimensional map, and thus it is possible to display a region in which deterioration has progressed. The representative values of the elastic waves AE are feature values related to the number of AE hits and a maximum amplitude for a certain period of time, a duration, and the like.

Information on a frequency distribution of one or more amplitudes included in the transmission data acquired by the acquirer 321 is stored in the storage 33e. The storage 33e is configured using a storage device such as a magnetic hard disk device or a semiconductor storage device.

Figure 14:
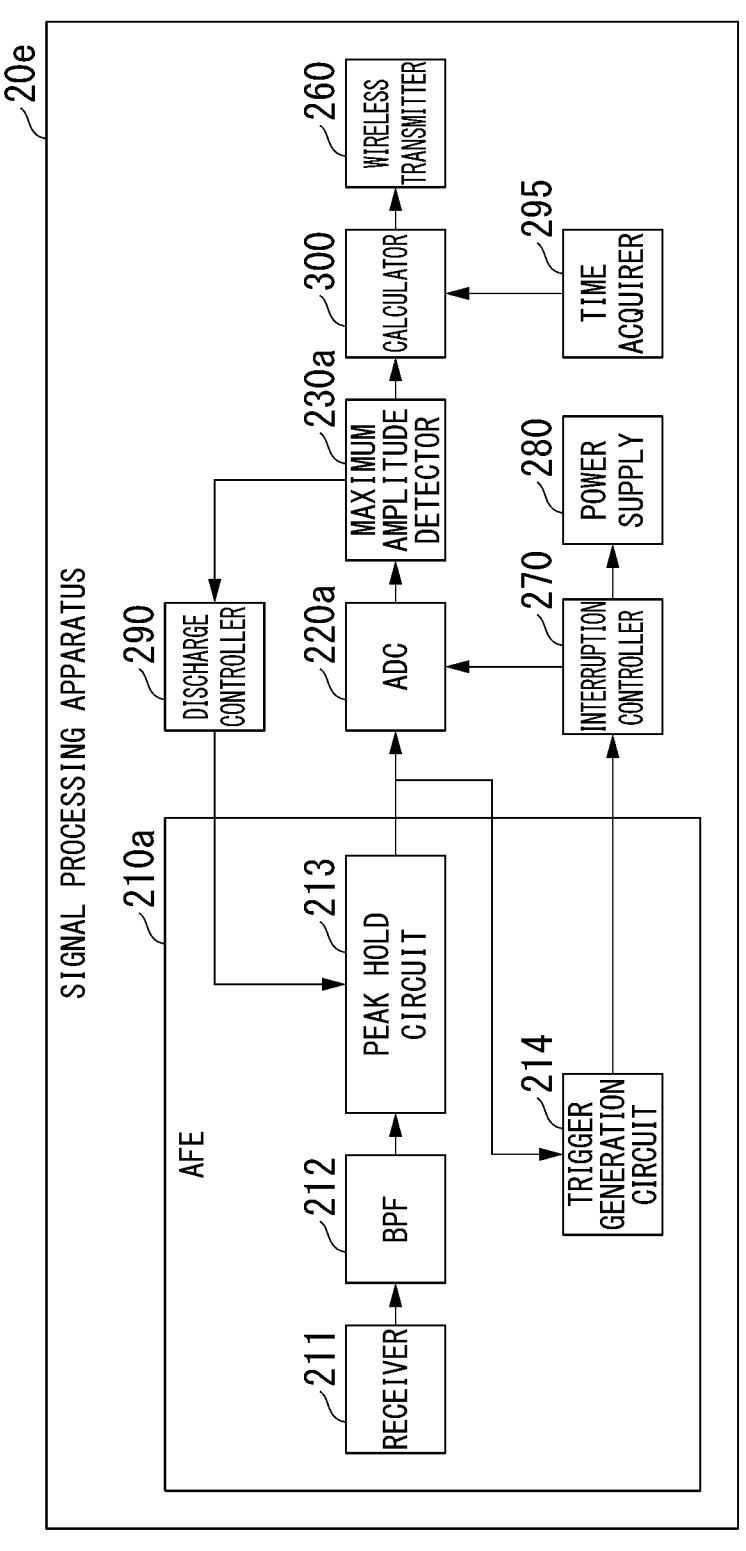
FIG. 14 is a diagram illustrating a configuration example of a signal processing apparatus in the sixth embodiment.

FIG. 14 is a diagram illustrating a configuration example of the signal processing apparatus 20e in the sixth embodiment. The signal processing apparatus 20e includes an AFE 210a, an ADC 220a, a maximum amplitude detector 230a, a wireless transmitter 260, an interruption controller 270, a power supply 280, a discharge controller 290, a time acquirer 295, and a calculator 300. The signal processing apparatus 20e is different in configuration from the signal processing apparatus 20a in that the signal processing apparatus 20e does not include the amplitude scale frequency distribution calculator 240 and the inclination calculator 250, but additionally includes the time acquirer 295 and the calculator 300. The other components included in the signal processing apparatus 20e are the same as those of the signal processing apparatus 20a. Hereinafter, differences will be mainly described.

In a case where the signal processing apparatus 20e is operating in a pause mode, the functions of the ADC 220a, the maximum amplitude detector 230a, the wireless transmitter 260, the discharge controller 290, and the calculator 300 are stopped. That is, the ADC 220a, the maximum amplitude detector 230a, the wireless transmitter 260, the discharge controller 290, and the calculator 300 do not perform processing.

The time acquirer 295 is an RTC and generates time information. The time acquirer 295 outputs time information when a maximum amplitude is detected by the maximum amplitude detector 230a to the calculator 300.

The calculator 300 collects the time information generated by the time acquirer 295 and information on the maximum amplitude detected by the maximum amplitude detector 230a for a predetermined period. The calculator 300 calculates an amplitude frequency distribution using the collected maximum amplitude information and time information for a predetermined period.

Figure 15:
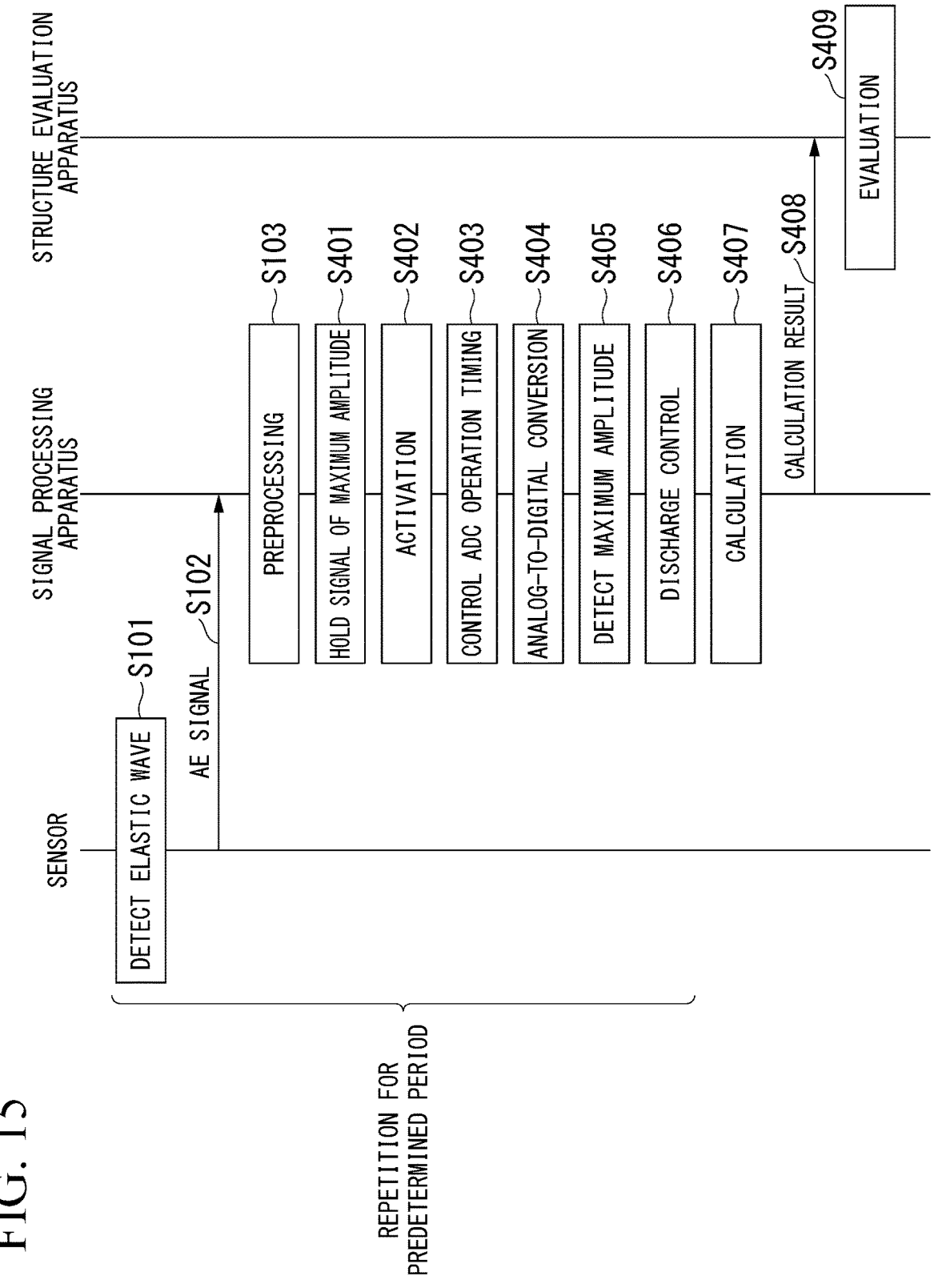
FIG. 15 is a sequence diagram illustrating a flow of processing of the structure evaluation system in the sixth embodiment.

FIG. 15 is a sequence diagram illustrating a flow of processing of the structure evaluation system 100e in the sixth embodiment. It is assumed that some functional units of the signal processing apparatus 20e are in a pause state at the start of the processing in FIG. 15. In FIG. 15, the same processing as in FIG. 6 is given the same reference numeral as in FIG. 6, and the description thereof is omitted.

When the processing from step S101 to step S103 is terminated, a peak hold circuit 213 holds a peak value of the noise-removed analog signal output from a BPF 212 (step S401). A trigger generation circuit 214 generates a running signal in a case where the signal level of the analog signal output from the peak hold circuit 213 exceeds a first signal threshold value. Here, it is assumed that the signal level of the analog signal exceeds the first signal threshold value. The trigger generation circuit 214 generates a running signal and outputs the generated running signal to the interruption controller 270.

The interruption controller 270 switches the operation mode of the signal processing apparatus 20e from a pause mode to an operation mode based on the running signal output from the trigger generation circuit 214. Thereby, the paused functional units of the signal processing apparatus 20e are activated (step S402). Further, the trigger generation circuit 214 generates timing information and controls an operation timing of the ADC 220a (step S403).

The ADC 220a quantizes the signal of the peak value of the amplitude of the noise-removed analog signal held by the peak hold circuit 213 and converts it into a digital signal at an operation timing based on the timing information generated by the trigger generation circuit 214 (step S404). The ADC 220a outputs the digital signal to the maximum amplitude detector 230a. The maximum amplitude detector 230a detects a maximum amplitude based on the digital signal output from the ADC 220a (step S405). The maximum amplitude detector 230a outputs information on the detected maximum amplitude to the calculator 300 and the discharge controller 290. The time acquirer 295 outputs time information when the maximum amplitude detector 230a detects the maximum amplitude to the calculator 300.

The discharge controller 290 discharges the peak hold circuit 213 in accordance with the information on the maximum amplitude which is output from the maximum amplitude detector 230a (step S406). Thereby, the signal of the peak value of the amplitude of the noise-removed analog signal held by the peak hold circuit 213 is discharged. In the signal processing apparatus 20e, the processing from step S101 to step S406 is repeatedly performed for a predetermined period. Thereby, the calculator 300 can acquire a plurality of combinations of the maximum amplitude information and the time information.

Due to the discharge of the peak hold circuit 213, the signal level of the noise-removed analog signal input to the peak hold circuit 213 is lowered. The interruption controller 270 switches the operation mode of the signal processing apparatus 20e from an operation mode to a pause mode in a case where a running signal is measured for a certain period of time, in a case where an operation mode is set for a certain period of time, or after the discharge controller 290 performs discharge.

Thereby, the operations of some functional units of the signal processing apparatus 20e are stopped. On the other hand, until the operations of some functional units of the signal processing apparatus 20e are stopped from the discharge control of the discharge controller 290, the calculator 300 calculates an amplitude frequency distribution using the maximum amplitude information and the time information for a predetermined period (step S407). The calculator 300 outputs the calculated amplitude frequency distribution to the wireless transmitter 260. The wireless transmitter 260 generates transmission data including the amplitude frequency distribution output from the calculator 300, and wirelessly transmits the generated transmission data to the structure evaluation apparatus 30e (step S408).

The communicator 31 of the structure evaluation apparatus 30e receives the transmission data transmitted from the signal processing apparatus 20e. The communicator 31 outputs the received transmission data to the acquirer 321. The acquirer 321 acquires an amplitude frequency distribution included in the transmission data. The acquirer 321 stores the acquired amplitude frequency distribution in the storage 33e, and outputs it to the evaluator 322e. The evaluator 322e performs evaluation based on the amplitude frequency distribution (step S409).

According to the structure evaluation system 100e configured as described above, the signal processing apparatus 20e is not activated at all times, and thus power consumption can be reduced. Further, although the structure evaluation system 100e has an event-driven configuration as in the related art, the structure evaluation system 100e includes the peak hold circuit 213, and thus it is possible to hold a peak value of a noise-removed analog signal which is input before all of the functional units of the signal processing apparatus 20e are activated. In addition, after all of the functional units of the signal processing apparatus 20e are activated, processing based on an elastic wave AE is performed based on the peak value of the noise-removed analog signal which is held in advance. For this reason, it is possible to solve a problem that an elastic wave AE that triggers the activating, which is a problem in an event-driven configuration of the related art, cannot be correctly measured. As a result, it is possible to improve the accuracy of evaluation.

Seventh Embodiment

Similarly to the third embodiment, a configuration using a second peak hold circuit with a different time constant in a trigger generation circuit will be described in a seventh embodiment. Note that a system configuration of a structure evaluation system 100e in the seventh embodiment is the same as that in the sixth embodiment, and only a configuration of a signal processing apparatus is different. For this reason, differences from the sixth embodiment will be mainly described.

A signal processing apparatus 20f has a plurality of modes including an operation mode and a pause mode and transitions to an operation mode when an elastic wave AE is detected. In a case where the signal processing apparatus 20f operates in a pause mode, the functions of some components included in the signal processing apparatus 20f are stopped. The signal processing apparatus 20f is in a pause mode until the signal processing apparatus 20f transitions to an operation mode. When the signal processing apparatus 20f transitions to an operation mode, the signal processing apparatus 20f performs processing based on the elastic wave AE.

Figure 16:
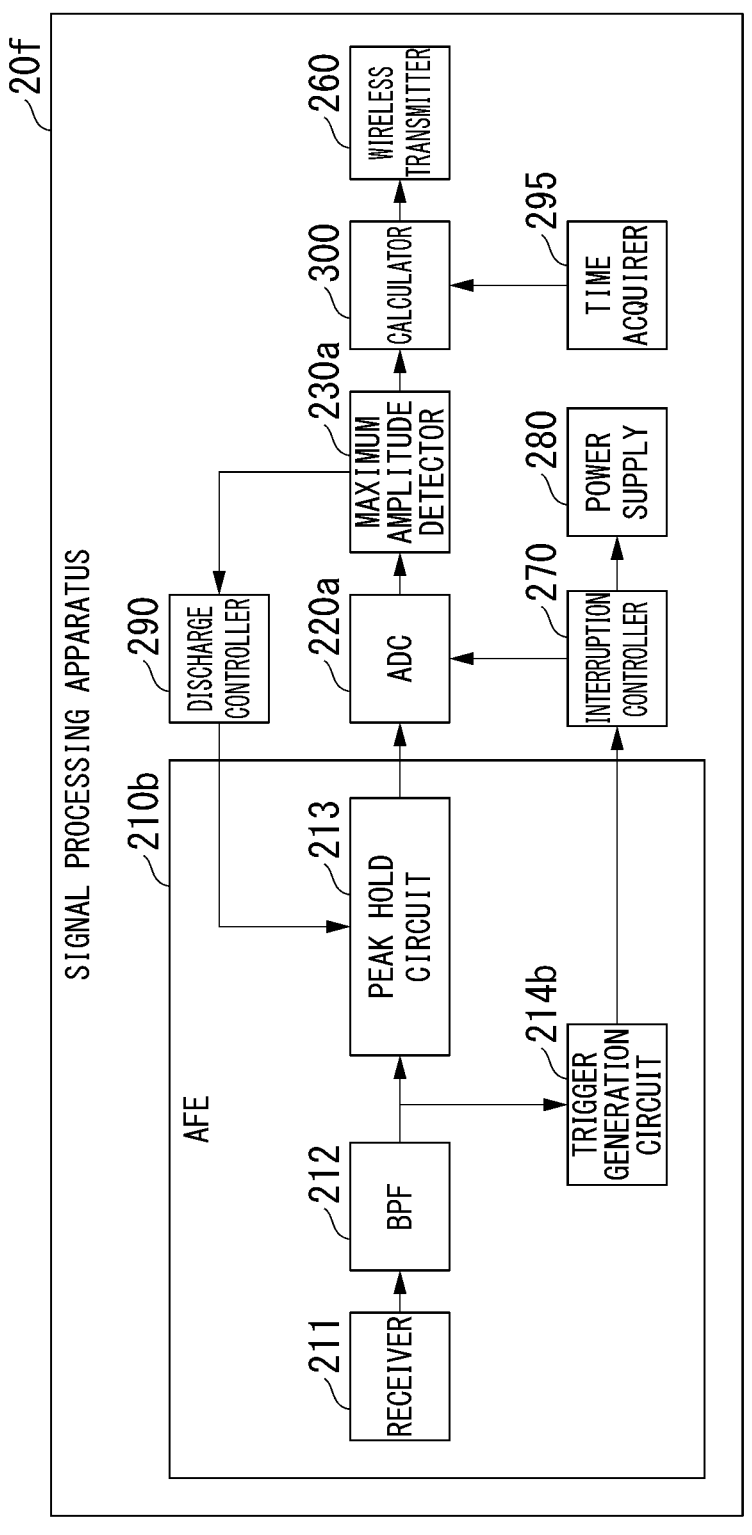
FIG. 16 is a diagram illustrating a configuration example of a signal processing apparatus in a seventh embodiment.

FIG. 16 is a diagram illustrating a configuration example of the signal processing apparatus 20f in the seventh embodiment. The signal processing apparatus 20*f* includes an AFE 210*b*, an ADC 220*a*, a maximum amplitude detector 230*a*, a wireless transmitter 260, an interruption controller 270, a power supply 280, a discharge controller 290, a time acquirer 295, and a calculator 300. Components other than the AFE 210*b* are the same as those in the sixth embodiment, and the configuration of the AFE 210*b* is the same as that of the AFE 210*b* in the third embodiment, and thus the description thereof is omitted.

Figure 17:
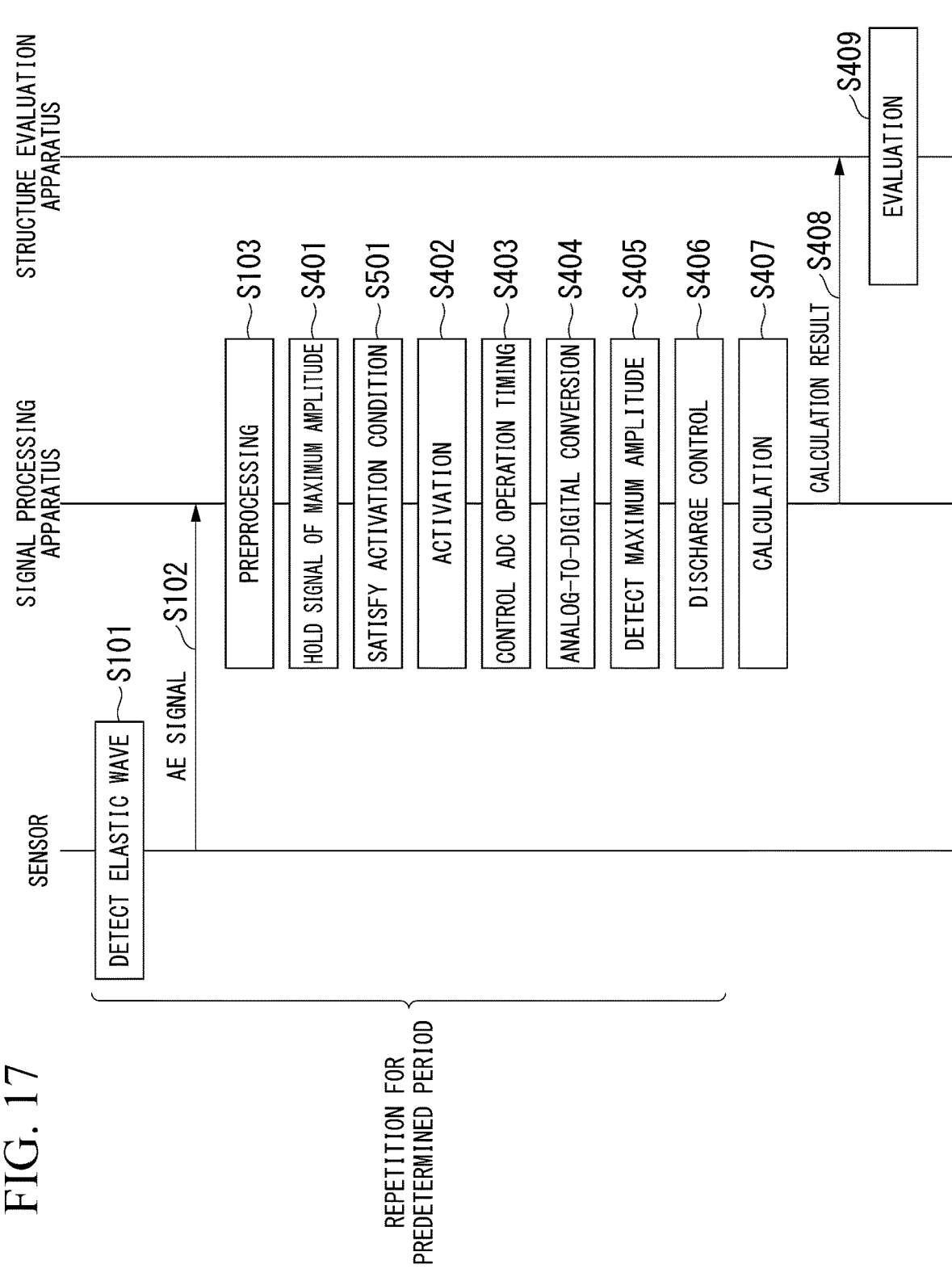
FIG. 17 is a sequence diagram illustrating a flow of processing of a structure evaluation system in the seventh embodiment.

FIG. 17 is a sequence diagram illustrating a flow of processing the structure evaluation system 100*e* in the seventh embodiment. It is assumed that some functional units of the signal processing apparatus 20*f* are in a pause state at the start of the processing in FIG. 17. In FIG. 17, the same processing as in FIG. 15 is given the same reference numeral as in FIG. 15, and the description thereof is omitted.

When the processing from step S101 to step S103 is terminated, the noise-removed analog signal after preprocessing is output from a BPF 212 to a peak hold circuit 213 and a trigger generation circuit 214*b*. The peak hold circuit 213 holds a peak value of the noise-removed analog signal output from the BPF 212 (step S401). The second peak hold circuit of the trigger generation circuit 214*b* holds the peak value of the noise-removed analog signal output from the BPF 212. A comparator determines that an activating condition is satisfied when the signal level of the noise-removed analog signal input to the second peak hold circuit exceeds a first signal threshold value and then falls below a second signal threshold value, and the comparator generates a running signal (step S501). The trigger generation circuit 214*b* outputs the generated running signal to the interruption controller 270. Thereby, the processing of step S402 and the subsequent processing are executed.

According to the structure evaluation system 100*e* in the seventh embodiment which is configured as described above, an envelope is detected to detect a termination timing of one elastic wave AE. Thereby, one elastic wave AE can be appropriately detected.

Modification Example of Seventh Embodiment

In the above-described embodiment, a configuration in which the trigger generation circuit 214*b* generates a running signal at a timing when the signal level of a noise-removed analog signal exceeds the first signal threshold value and then falls below the second signal threshold value has been described. On the other hand, a configuration in which a NOT circuit is incorporated between the second peak hold of the trigger generation circuit 214*b* and the comparator may be adopted. With such a configuration, the interruption controller 270 has a running signal of (H).

Modification Example Common to Sixth Embodiment and Seventh Embodiment

The structure evaluation system 100*e* may be configured to activate the signal processing apparatuses 20*e* and 20*f* in two steps, as described in the fifth embodiment. With such a configuration, the structure evaluation system 100*e* further includes an activation controller 15.

Modification Example Common to First to Seventh Embodiments

In the above-described embodiments, a configuration using the ADCs 220 and 220*a* has been described, but a plurality of comparators may be used instead of the ADCs 220 and 220*a*. With such a configuration, the maximum amplitude detectors 230 and 230*a* detect a maximum amplitude based on noise-removed analog signals input to the plurality of comparators.

According to at least one embodiment described above, it is possible to suppress power consumption by an acoustic emission method by including the plurality of sensors 10 that detect elastic waves AE generated from a structure, the signal processing apparatus 20 that calculates information on a frequency distribution by amplitude scale based on the elastic waves detected by each of the plurality of sensors 10 and transmit the calculated information on the frequency distribution by amplitude scale in a wireless manner, and the evaluator 322 that evaluates the state of deterioration of the structure based on the information on the frequency distribution by amplitude scale which is transmitted from the signal processing apparatus 20.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A structure evaluation system comprising:
   one or more sensors configured to detect elastic waves generated from a structure;
   a signal processing apparatus configured to calculate information on a frequency distribution by amplitude scale based on the plurality of elastic waves detected by each of the one or more sensors, and transmits the calculated information on the frequency distribution by amplitude scale in a wireless manner; and
   an evaluator configured to evaluate a state of deterioration of the structure based on the information on the frequency distribution by amplitude scale which is transmitted from the signal processing apparatus,
   wherein
   the signal processing apparatus has a plurality of modes including an operation mode and a pause mode,
   the operation mode is a mode that performs processing based on the frequency distribution by amplitude scale, the processing including calculating the information on the frequency distribution by amplitude scale,
   the pause mode is a mode in which power consumption is made smaller than the operation mode by limiting a function,
   the signal processing apparatus includes a peak hold circuit configured to hold a value of a maximum amplitude of the elastic waves detected by the one or more sensors at least during the pause mode, and
   the signal processing apparatus calculates the information on the frequency distribution by amplitude scale using the value of the maximum amplitude of the elastic waves which is held by the peak hold circuit for a predetermined period after the signal processing apparatus transitions to the operation mode.

2. The structure evaluation system according to claim 1, wherein the signal processing apparatus detects a maximum amplitude of the plurality of elastic waves, and calculates the information on the frequency distribution by amplitude scale based on the detected maximum amplitude of the plurality of elastic waves.

3. The structure evaluation system according to claim 1, wherein
the signal processing apparatus includes
a calculator configured to calculate the information on the frequency distribution by amplitude scale, and
an interruption controller configured to make the signal processing apparatus transition from the pause mode to the operation mode in a case where a signal level of an elastic wave output from the peak hold circuit exceeds a first threshold value, and
the calculator calculates the information on the frequency distribution by amplitude scale using the value of the maximum amplitude of the elastic waves which is held by the peak hold circuit for a predetermined period after the transition to the operation mode.

4. The structure evaluation system according to claim 3, wherein the signal processing apparatus further includes a time acquirer configured to acquire time information, and
the calculator calculates the information on the frequency distribution by amplitude scale including time information when a value of a maximum amplitude of each elastic wave is detected.

5. The structure evaluation system according to claim 1, wherein
the signal processing apparatus further includes
a calculator configured to calculate the information on the frequency distribution by amplitude scale, and
an interruption controller configured to detect a signal equivalent to an envelope of an elastic wave and makes the signal processing apparatus transition from the pause mode to the operation mode in a case where a condition indicating that no elastic wave has been detected after the detection of the elastic wave is satisfied, and
the calculator calculates the information on the frequency distribution by amplitude scale using the value of the maximum amplitude of the elastic waves which is held by the peak hold circuit for a predetermined period after the transition to the operation mode.

6. The structure evaluation system according to claim 1, wherein the signal processing apparatus calculates any one of a frequency distribution by amplitude scale, an intercept obtained by linearly approximating the frequency distribution by amplitude scale, or an inclination obtained by linearly approximating the frequency distribution by amplitude scale as the information on the frequency distribution by amplitude scale.

7. The structure evaluation system according to claim 1, wherein the signal processing apparatus changes at least a period for calculating the information on the frequency distribution by amplitude scale or the number of hits of elastic waves in response to a command wirelessly transmitted from the structure evaluation apparatus.

8. The structure evaluation system according to claim 1, wherein the plurality of modes further includes a signal reception mode for detecting the elastic waves,
wherein the signal processing apparatus further includes:
an activation controller configured to switch the signal processing apparatus from the pause mode to the signal reception mode; and
an interruption controller configured to switch the signal processing apparatus to the operation mode, wherein the activation controller activates some functional units by switching the signal processing apparatus to the signal reception mode when approach of a vehicle traveling on the structure is detected, and
the interruption controller activates a remaining functional units by switching the signal processing apparatus to the operation mode when a predetermined condition is satisfied.

9. A structure evaluation system comprising:
one or more sensors configured to detect elastic waves generated from a structure;
a signal processing apparatus configured to hold a value of a maximum amplitude of an elastic wave detected by each of the one or more sensors, calculates information on the elastic wave using the held value of the maximum amplitude of the elastic wave for a predetermined period, and transmits the calculated information on the elastic wave in a wireless manner; and
an evaluator configured to evaluate a state of deterioration of the structure based on the transmitted information on the elastic wave,
wherein
the signal processing apparatus has a plurality of modes including an operation mode and a pause mode,
the operation mode is a mode that performs processing based on the elastic wave, the processing including calculating the information on the elastic wave,
the pause mode is a mode in which power consumption is made smaller than the operation mode by limiting a function,
the signal processing apparatus includes a peak hold circuit configured to hold a value of a maximum amplitude of the elastic waves detected by the one or more sensors at least during the pause mode, and
the signal processing apparatus calculates the information on the elastic wave using the value of the maximum amplitude of the elastic waves which is held by the peak hold circuit for a predetermined period after the signal processing apparatus transitions to the operation mode.

10. The structure evaluation system according to claim 9, wherein
the signal processing apparatus includes
a calculator configured to calculate the information on the elastic wave, and
an interruption controller configured to make the signal processing apparatus transition from the pause mode to the operation mode in a case where a signal level of the elastic wave output from the peak hold circuit exceeds a first threshold value, and
the calculator calculates the information on the elastic wave using the value of the maximum amplitude of each elastic wave which is held by the peak hold circuit for a predetermined period after the transition to the operation mode.

11. The structure evaluation system according to claim 9, wherein
the signal processing apparatus further includes
a calculator configured to calculate the information on the elastic wave, and
an interruption controller configured to detect a signal equivalent to an envelope of an elastic wave and makes the signal processing apparatus transition from the pause mode to the operation mode in a case where a condition indicating that no elastic wave has been detected after the detection of the elastic wave is satisfied, and the calculator calculates the information on the elastic wave using the value of the maximum amplitude of the elastic wave which is held by the peak hold circuit for a predetermined period after the transition to the operation mode.

12. The structure evaluation system according to claim 9, wherein the plurality of modes further includes a signal reception mode for detecting the elastic waves, wherein the signal processing apparatus further includes:

an activation controller configured to switch the signal processing apparatus from the pause mode to the signal reception mode; and an interruption controller configured to switch the signal processing apparatus to the operation mode, wherein the activation controller activates some functional units by switching the signal processing apparatus to the signal reception mode when approach of a vehicle traveling on the structure is detected, and the interruption controller activates a remaining functional units by switching the signal processing apparatus to the operation mode when a predetermined condition is satisfied.

13. A signal processing apparatus comprising:

a calculator configured to calculate information on a frequency distribution by amplitude scale based on a plurality of elastic waves detected by each of one or more sensors that detect elastic waves generated from a structure; and a wireless transmitter configured to wirelessly transmit information on the frequency distribution by amplitude scale which is calculated by the calculator to a structure evaluation apparatus that evaluates a state of deterioration of the structure, wherein the signal processing apparatus has a plurality of modes including an operation mode and a pause mode, the operation mode is a mode that performs processing based on the frequency distribution by amplitude scale, the processing including calculating the information on the frequency distribution by amplitude scale, the pause mode is a mode in which power consumption is made smaller than the operation mode by limiting a function, the signal processing apparatus includes a peak hold circuit configured to hold a value of a maximum amplitude of the elastic waves detected by the one or more sensors at least during the pause mode, and the calculator calculates the information on the frequency distribution by amplitude scale using the value of the maximum amplitude of the elastic waves which is held by the peak hold circuit for a predetermined period after the signal processing apparatus transitions to the operation mode.

14. A signal processing apparatus comprising:

a peak hold circuit configured to hold a value of a maximum amplitude of an elastic wave detected by each of one or more sensors that detect elastic waves generated from a structure; and a wireless transmitter configured to calculate information on the elastic wave using the value of the maximum amplitude of the elastic wave which is held by the peak hold circuit for a predetermined period, and wirelessly transmits the calculated information on the elastic wave to a structure evaluation apparatus that evaluates a state of deterioration of the structure, wherein the signal processing apparatus has a plurality of modes including an operation mode and a pause mode, the operation mode is a mode that performs processing based on the elastic wave, the processing including calculating the information on the elastic wave, the pause mode is a mode in which power consumption is made smaller than the operation mode by limiting a function, the peak hold circuit holds a value of a maximum amplitude of the elastic waves detected by the one or more sensors at least during the pause mode, and the signal processing apparatus calculates the information on the elastic wave using the value of the maximum amplitude of the elastic waves which is held by the peak hold circuit for a predetermined period after the signal processing apparatus transitions to the operation mode.

15. A structure evaluation method comprising:

holding, by a peak hold circuit, a value of a maximum amplitude of elastic waves detected by each of one or more sensors that detect elastic waves generated from a structure, at least during a signal processing apparatus a pause mode, the peak hold circuit providing in a signal processing apparatus has a plurality of modes including an operation mode and the pause mode;

calculating information on a frequency distribution by amplitude scale using the value of the maximum amplitude of the elastic waves which is held by the peak hold circuit for a predetermined period after the signal processing apparatus transitions to the operation mode;

transmitting the calculated information on the frequency distribution by amplitude scale in a wireless manner; and evaluating a state of deterioration of the structure based on the information on the frequency distribution by amplitude scale which is transmitted in a wireless manner, wherein the operation mode is a mode that performs processing based on the frequency distribution by amplitude scale, the processing including calculating the information on the frequency distribution by amplitude scale, and the pause mode is a mode in which power consumption is made smaller than the operation mode by limiting a function.

16. A structure evaluation method comprising:

Holding, by a peak hold circuit, a value of a maximum amplitude of elastic waves detected by each of one or more sensors that detect elastic waves generated from a structure, at least during a signal processing apparatus a pause mode, the peak hold circuit providing in a signal processing apparatus has a plurality of modes including an operation mode and the pause mode;

calculating information on the elastic wave using the value of the maximum amplitude of the elastic waves which is held by the peak hold circuit for a predetermined period after the signal processing apparatus the transitions to the operation mode;

transmitting the calculated information on the elastic wave in a wireless manner; and evaluating a state of deterioration of the structure based on the information on the elastic wave which is transmitted in the wireless manner, wherein the operation mode is a mode that performs processing based on the elastic wave, the processing including calculating the information on the elastic wave, and the pause mode is a mode in which power consumption is made smaller than the operation mode by limiting a function.

17. A non-transitory computer readable recording medium storing a computer program which enables a computer to execute the following processing:

calculating information on a frequency distribution by amplitude scale based on a plurality of elastic waves detected by each of one or more sensors that detect elastic waves generated from a structure; and wirelessly transmitting information on the frequency distribution by amplitude scale which is calculated in the calculating of the information to a structure evaluation apparatus that evaluates a state of deterioration of the structure, wherein the computer calculates the information on the frequency distribution by amplitude scale using the value of the maximum amplitude of the elastic waves, which are held by a peak hold circuit that holds the value of the maximum amplitude of the elastic waves detected by the one or more sensors during the pause mode, for a predetermined period, the operation mode is a mode that performs processing based on the frequency distribution by amplitude scale, the processing including calculating the information on the frequency distribution by amplitude scale, the pause mode is a mode in which power consumption is made smaller than the operation mode by limiting a function.

18. A non-transitory computer readable recording medium storing a computer program which enables a computer to execute the following processing:

calculating information on an elastic wave using the elastic wave detected by each of one or more sensors that detect elastic waves generated from a structure for a predetermined period; and wirelessly transmitting the information on the elastic wave which is calculated in the calculating of the information to a structure evaluation apparatus that evaluates a state of deterioration of the structure, wherein the computer calculates the information on the elastic wave using the value of the maximum amplitude of the elastic waves, which are held by a peak hold circuit that holds the value of the maximum amplitude of the elastic waves detected by the one or more sensors during the pause mode, for a predetermined period, the operation mode is a mode that performs processing based on the elastic wave, the processing including calculating the information on the elastic wave, the pause mode is a mode in which power consumption is made smaller than the operation mode by limiting a function.

* * * * *